United States Patent [19]

Chamberlain et al.

[11] 4,262,283

[45] Apr. 14, 1981

[54] SYSTEM FOR TRANSMITTING ALARM INFORMATION OVER TELEPHONE LINES

[75] Inventors: Ian C. Chamberlain, Stanmore; Michael J. Barton, Pinner; Michael H. Howard, Croxley Green, all of England

[73] Assignee: The Post Office, London, England

[21] Appl. No.: 882,098

[22] Filed: Mar. 1, 1978

[30] Foreign Application Priority Data

Mar. 4, 1977 [GB] United Kingdom ................. 9246/77

[51] Int. Cl.³ ......................... G08B 1/08; H04Q 1/30; G08B 23/00; G08B 26/00

[52] U.S. Cl. .................................... 340/533; 179/5 R; 340/502; 340/514; 340/518; 340/568

[58] Field of Search ............... 340/518, 531, 502, 504, 340/517, 533, 503, 514, 539, 568, 534, 541; 179/2.5 R, 2 R, 5 R, 15 FD, 15 AT, 15 AQ, 15 BF, 15 BY, 2.51; 370/77, 85, 66, 68, 76, 13, 69

[56] References Cited

U.S. PATENT DOCUMENTS

| | | | |
|---|---|---|---|
| 3,611,363 | 10/1971 | McCrea | 340/518 |
| 3,735,353 | 5/1973 | Donovan et al. | 340/518 |
| 3,792,469 | 2/1974 | McLean et al. | 340/518 |
| 3,803,594 | 4/1974 | Klein et al. | 340/518 |
| 3,914,692 | 10/1975 | Seaborn | 340/502 |
| 3,927,404 | 12/1975 | Cooper | 340/518 |
| 3,937,889 | 2/1976 | Bell et al. | 179/5 R |
| 3,988,724 | 10/1976 | Anderson | 340/539 |
| 4,013,840 | 3/1977 | Anderson | 179/2.5 R |
| 4,023,139 | 5/1977 | Samburg | 340/541 |
| 4,067,008 | 1/1978 | Sprowls | 340/518 |

Primary Examiner—John W. Caldwell, Sr.
Assistant Examiner—James J. Groody
Attorney, Agent, or Firm—Cushman, Darby & Cushman

[57] ABSTRACT

An alarm system for transmitting alarm information via telephone lines has a plurality of alarm transmitters which are located at subscribers' premises and are adapted to transmit signals indicative of the state of alarms associated with the transmitters along telephone lines to associated receivers. The receivers are located at one or more local exchanges and the receivers at a local exchange are all connected to a local processor. The or each local processor is connected to a central processor which can direct alarm information to one of a number of terminal stations. The local processors continuously scan the outputs of the receivers. When a local processor detects a signal indicative of an alarm condition it transmits a signal coded with the subscriber identity and destination for the alarm information to the central processor which routes the alarm message to the appropriate terminal station. Each transmitter produces a carrier wave which is modulated with one or more other frequencies according to the state of the alarm being monitored.

32 Claims, 15 Drawing Figures

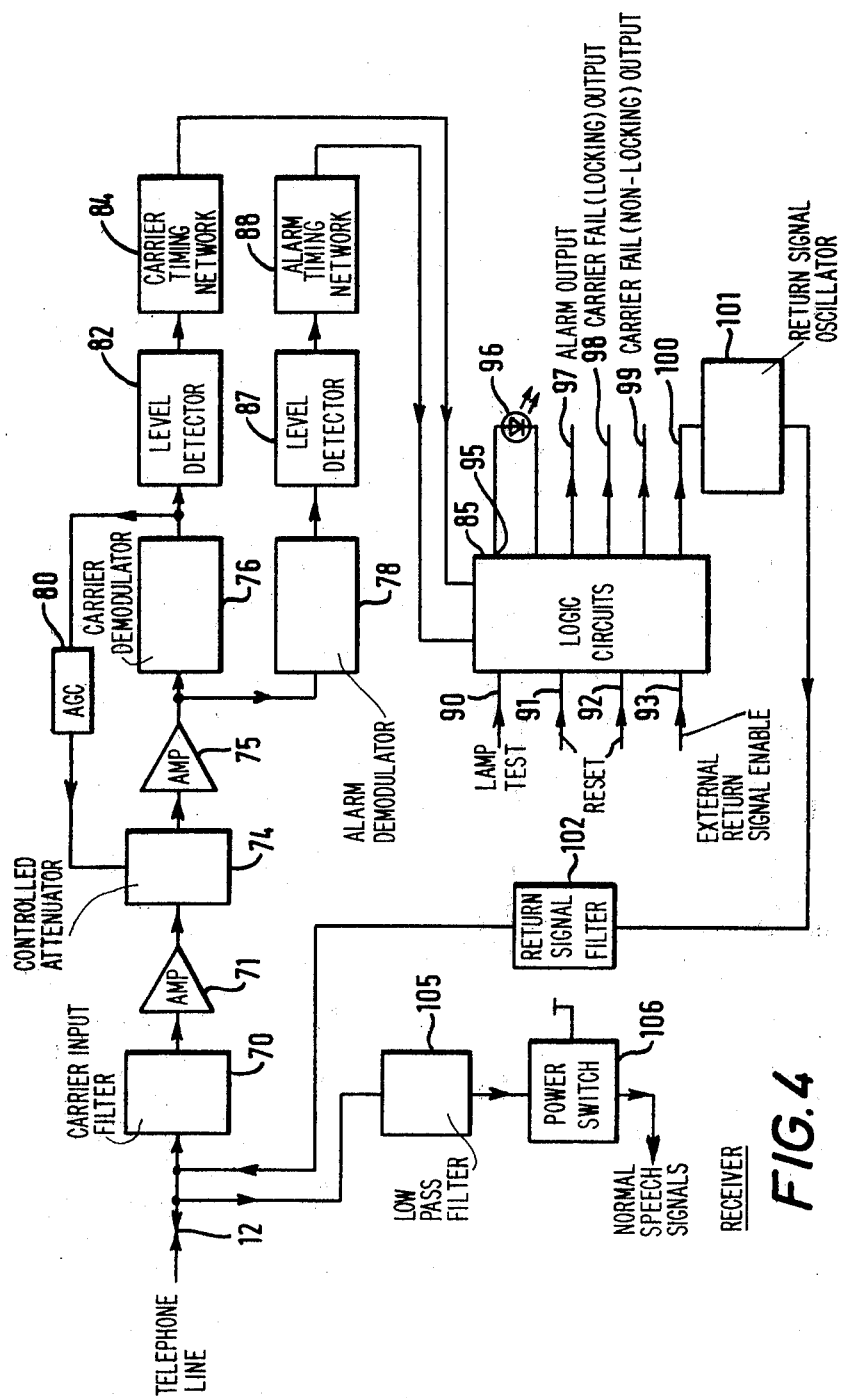

LOCAL PROCESSOR

CENTRAL PROCESSOR

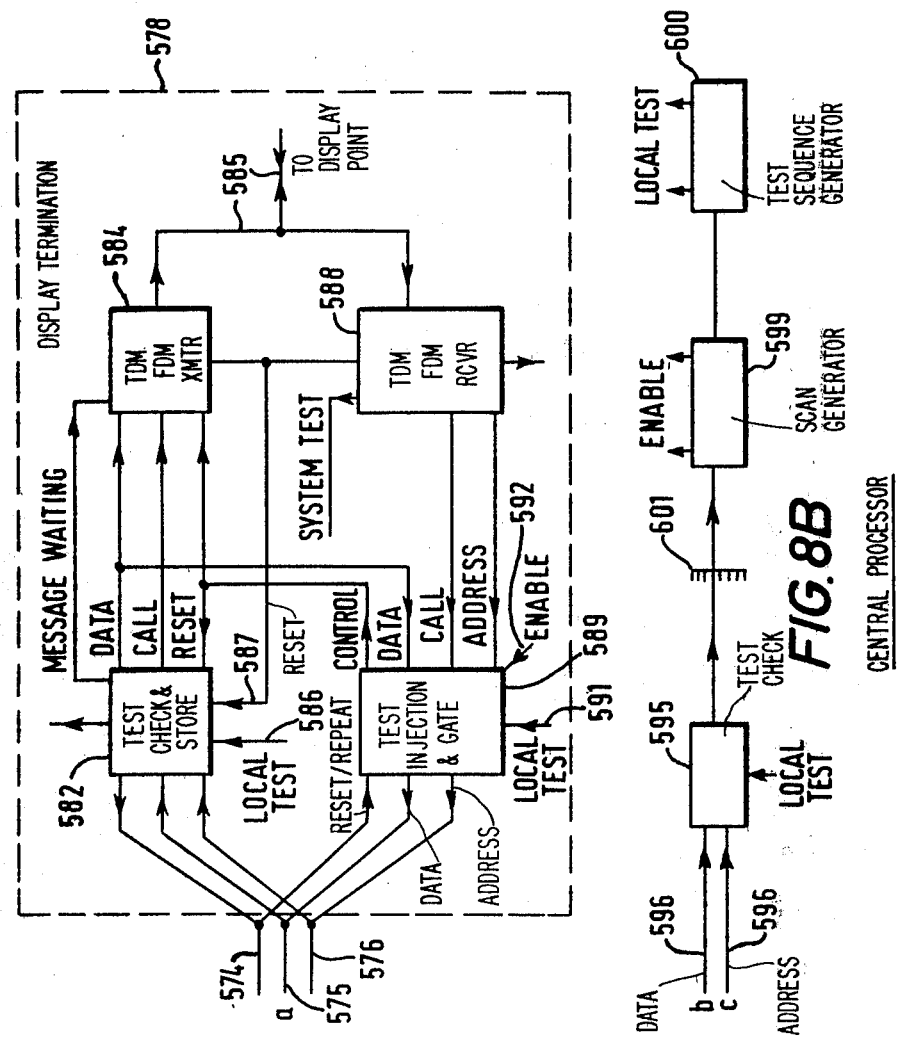

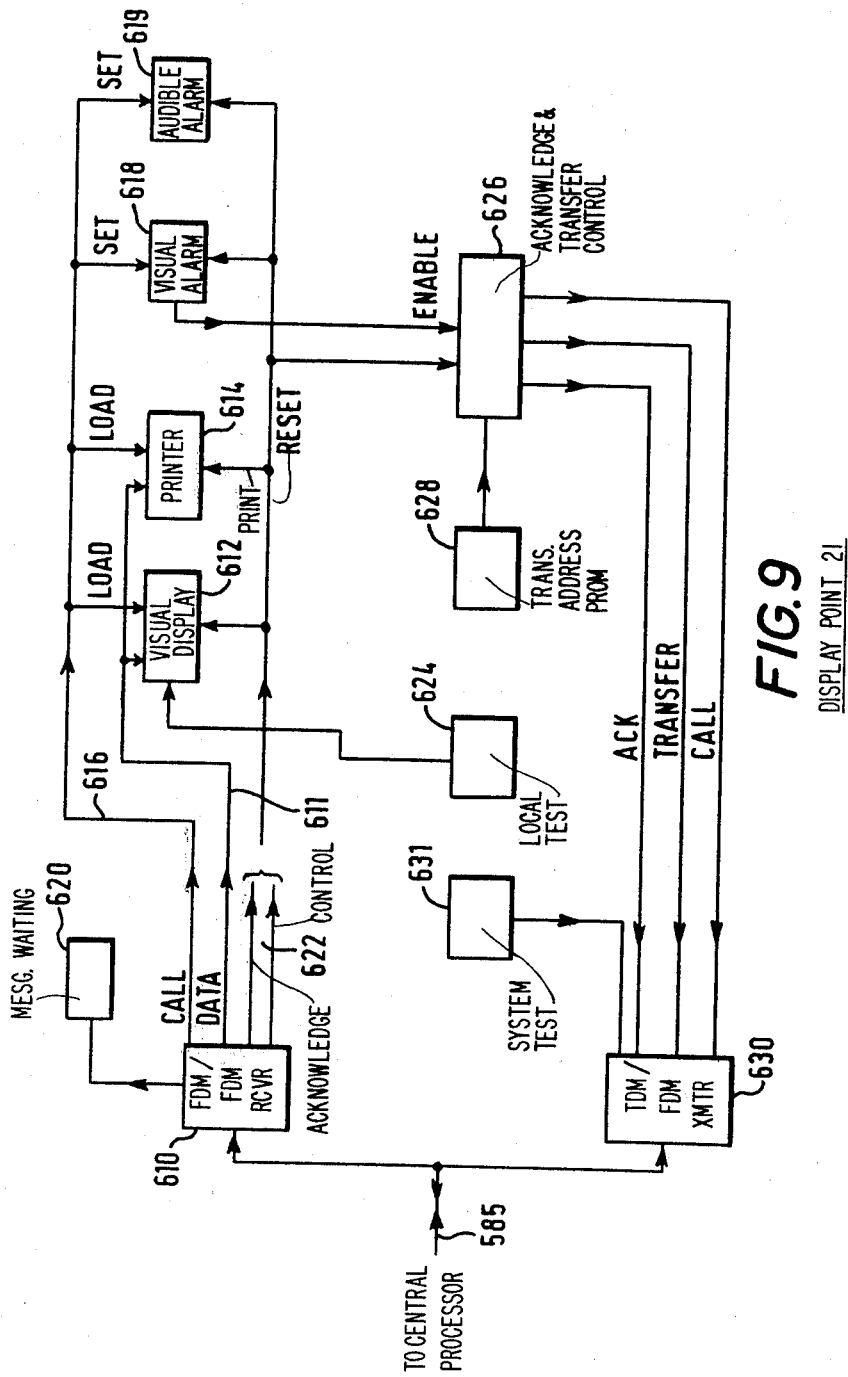

SYSTEM FOR TRANSMITTING ALARM INFORMATION OVER TELEPHONE LINES

This invention relates to a system for transmitting alarm information via telephone lines from subscribers' premises to one of a number of terminal stations.

The alarm system is of the type which has a plurality of transmitters which are located at subscribers' premises each transmitter being adapted to transmit signals indicative of the state of its associated alarm to a telephone line, said signals being in the form of modulated carrier waves, a plurality of receivers located at one or more local exchanges for receiving the transmitted signals, the or each local exchange having a local processor which is arranged to sequentially scan the outputs of the receivers at its exchange and, when it detects a signal indicative of an alarm condition, to transmit a signal coded with information indicative of subscriber identity and alarm information destination to a central processor which is operative to direct the alarm information to one of a number of terminal stations. Such an alarm system will be called a system of the kind referred to.

In accordance with one aspect of the present invention each transmitter is arranged to produce a carrier wave which is modulated with one or more of a plurality of other frequencies according to the state of the alarm being monitored. The carrier wave may be amplitude modulated by a combination of three tone frequencies.

Each transmitter may include a carrier oscillator the output of which is connected to a modulator, said modulator being connected to a plurality of tone oscillators the outputs of which modulate the carrier wave. The tone oscillators may be controlled by one or more alarm monitor circuits each of which includes a switching stage which is arranged to switch when an alarm is actuated.

Each receiver may include a detector for detecting the amplitude modulated carrier wave and decode logic for decoding the modulation tones to provide output information in binary form which is indicative of the state of an associated alarm.

Each local processor may have means for continuously scanning the outputs of the receivers connected thereto, memory means for storing data indicative of alarm conditions sensed during the previous scanning sequence, means for comparing the condition of each alarm with its condition during the previous scanning sequence and means responsive to said comparing means detecting a change in the condition of an alarm for transmitting a signal indicative of said alarm and its destination to the central processor.

The central processor may comprise a plurality of local processor terminations, one for each local processor, a plurality of terminal station terminations, highways linking the processor terminations and terminal station terminations, and means for sequentially scanning the local processor terminations, each terminal station termination being responsive to an alarm signal received by a processor termination and addressed with a particular code to direct that alarm signal to the appropriate termination.

According to another aspect of the present invention there is provided a local processor for a system of the kind referred to comprising means for continuously scanning the outputs of the receivers connected thereto, memory means for storing data indicative of alarm conditions sensed during the previous scanning sequence, means for comparing the condition of each alarm with its condition during the previous scanning sequence and means responsive to said comparing means detecting a change in the condition of an alarm for transmitting a signal indicative of said alarm and its destination to the central processor.

According to a further aspect of the present invention there is provided a central processor for a system of the kind referred to comprising a plurality of local processor terminations, one for each local processor, a plurality of terminal station terminations, highways linking the processor terminations and terminal station terminations, and means for sequentially scanning the local processor terminations, each terminal station termination being responsive to an alarm signal received by a processor termination and addressed with a particular code to direct that alarm signal to the appropriate termination.

The invention will be described now by way of example only with particular reference to the accompanying drawings. In the drawings:

FIG. 4 is a block schematic diagram of the receiving portion of the equipment of FIG. 2;

Figure 1:
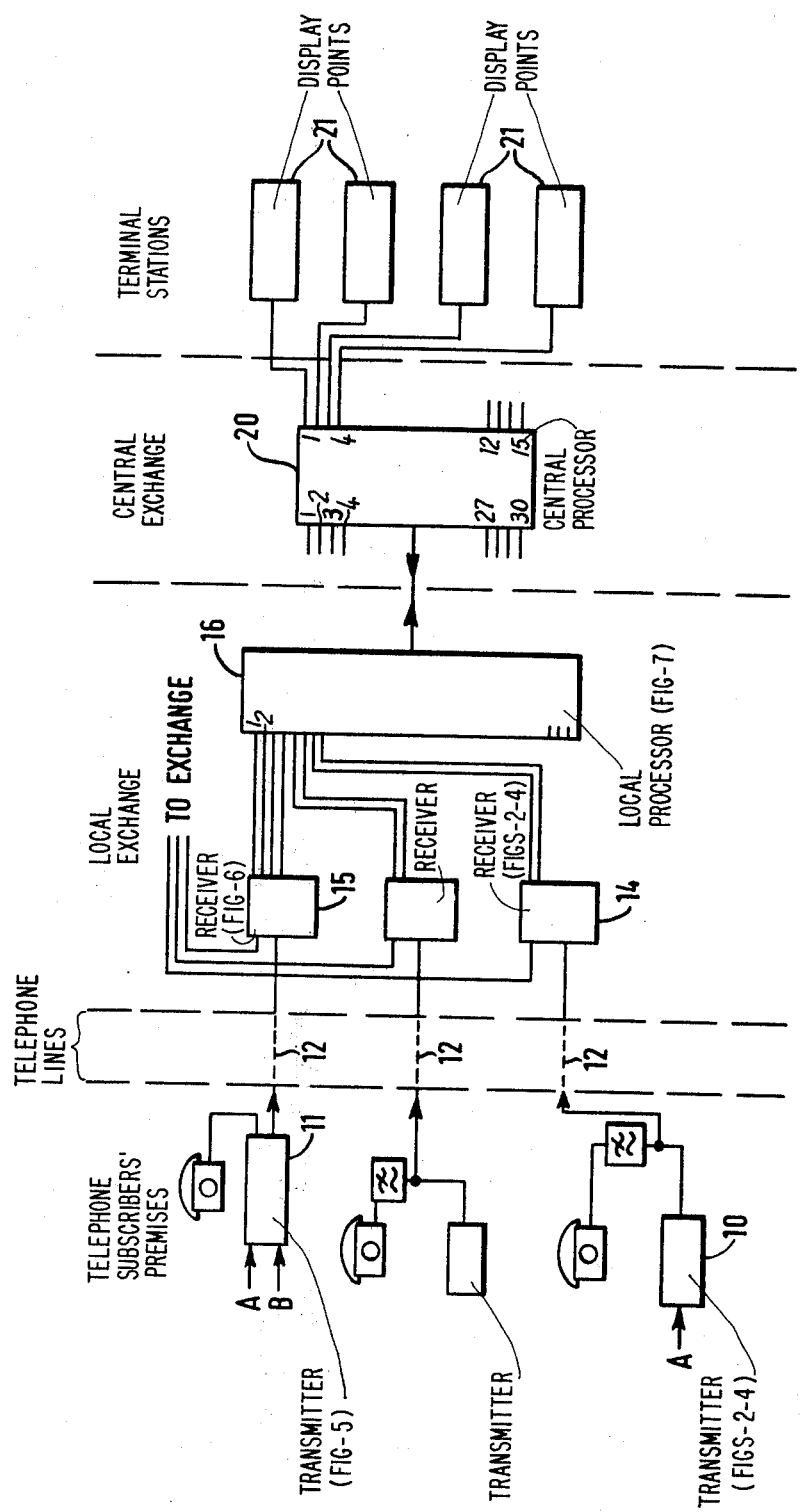
FIG. 1 is a block schematic diagram of an alarm signalling system.
Figure 5A:
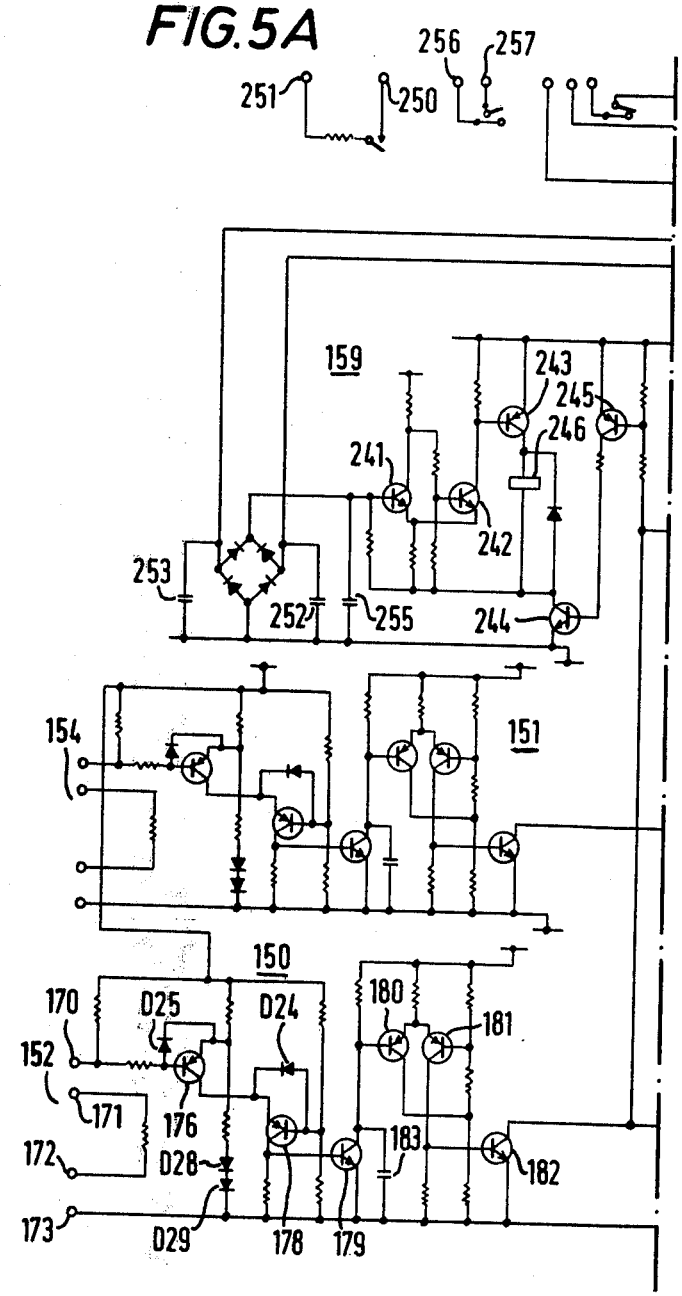
Figure 5B:
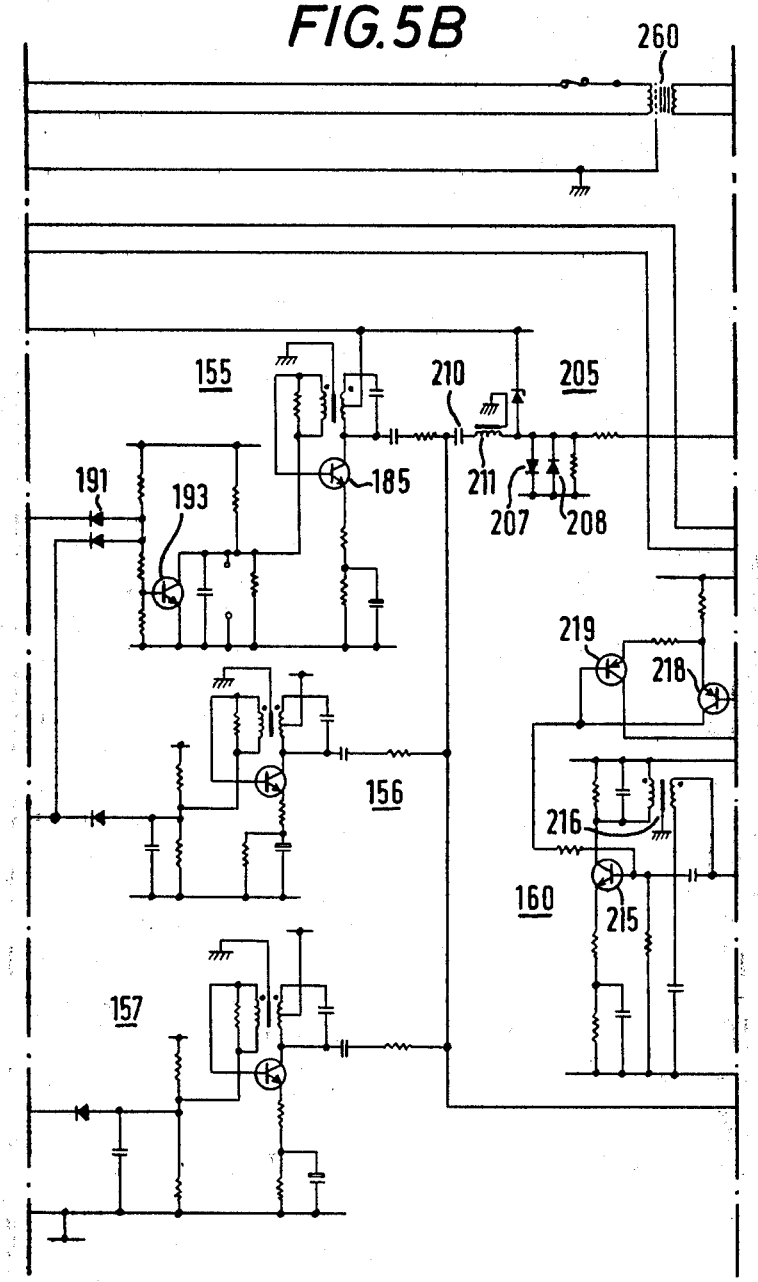
Figure 5C:
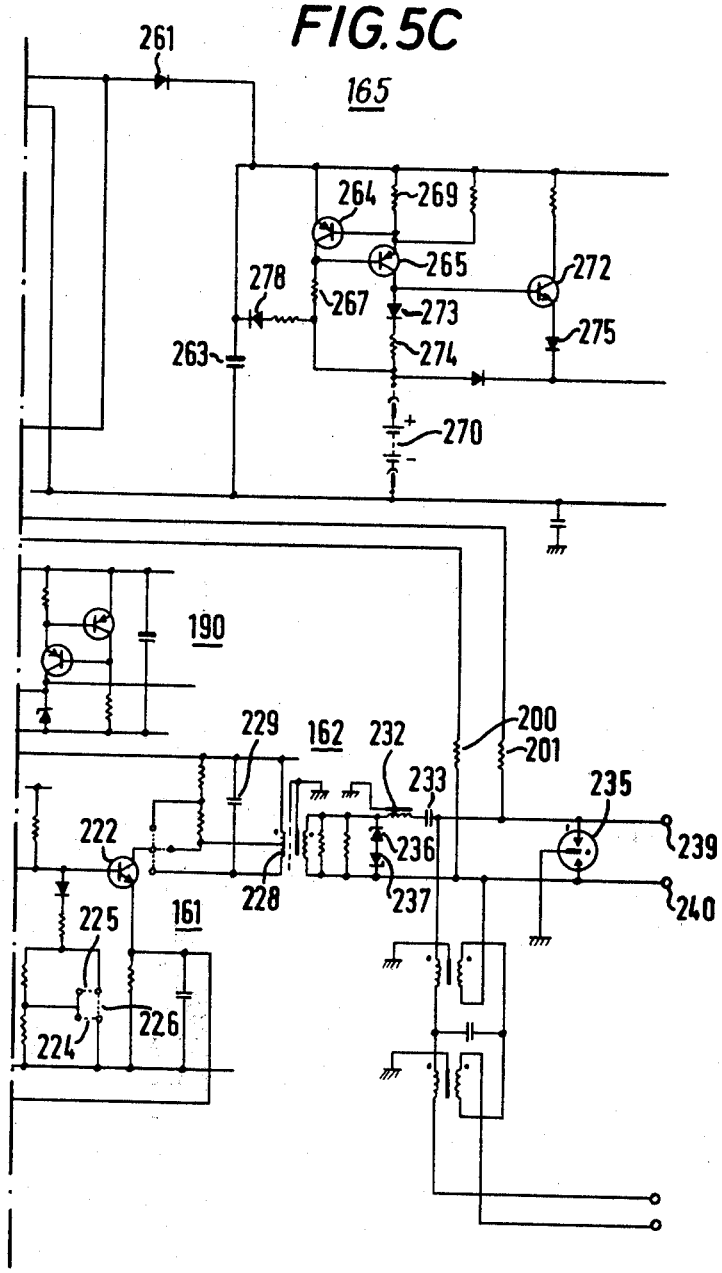
Figure 6A:
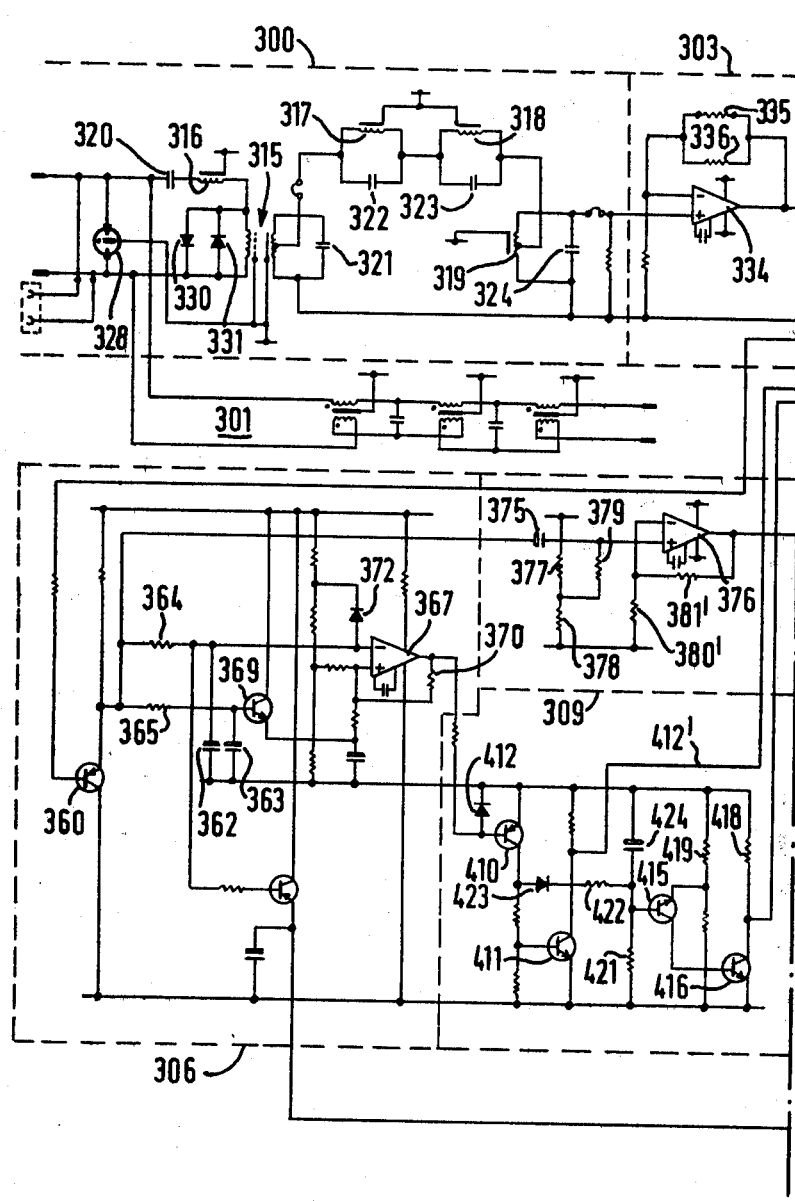
Figure 6B:
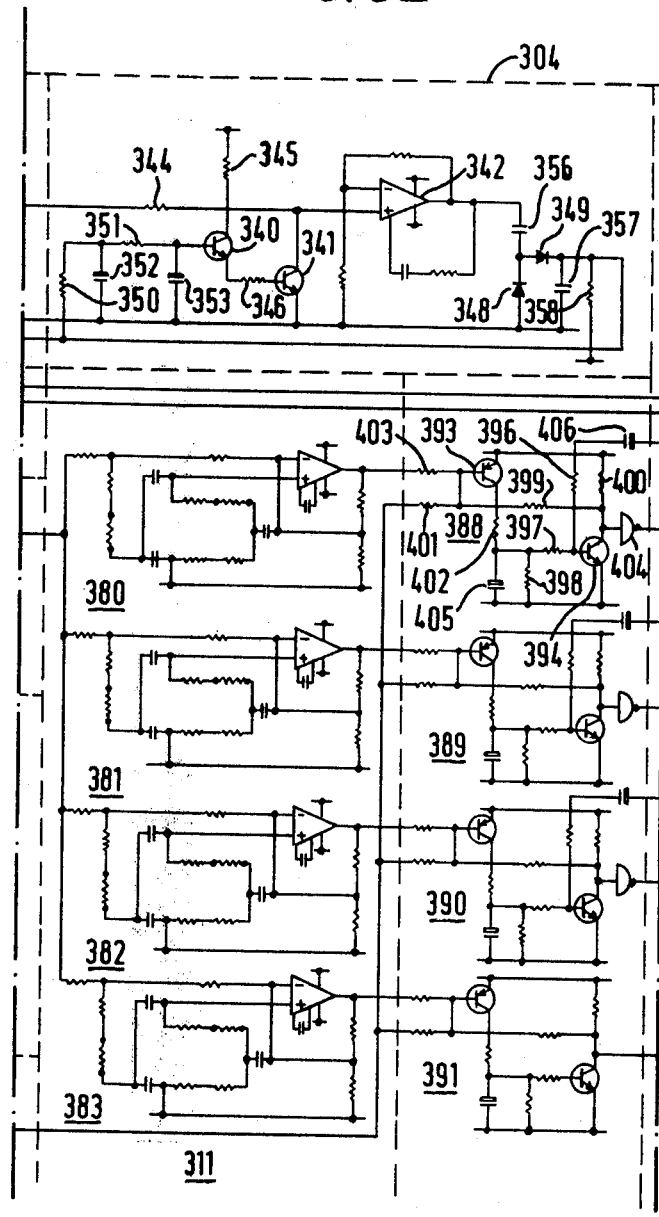
Figure 6C:
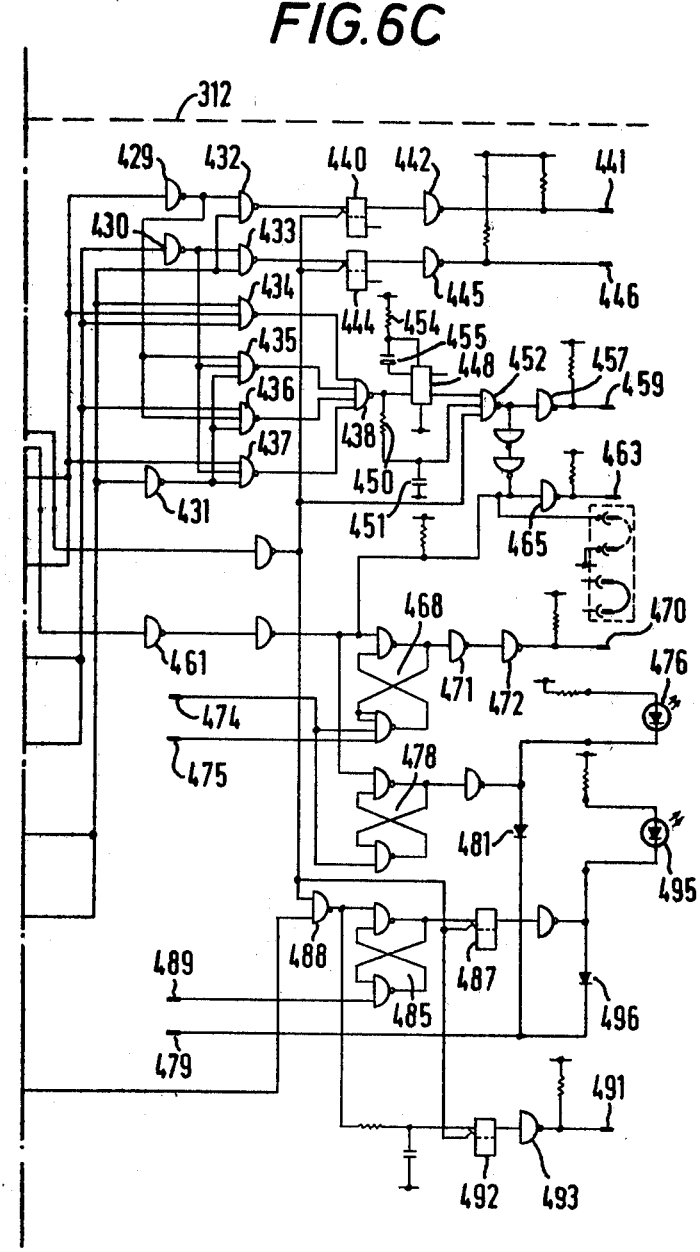
Figure 7A:
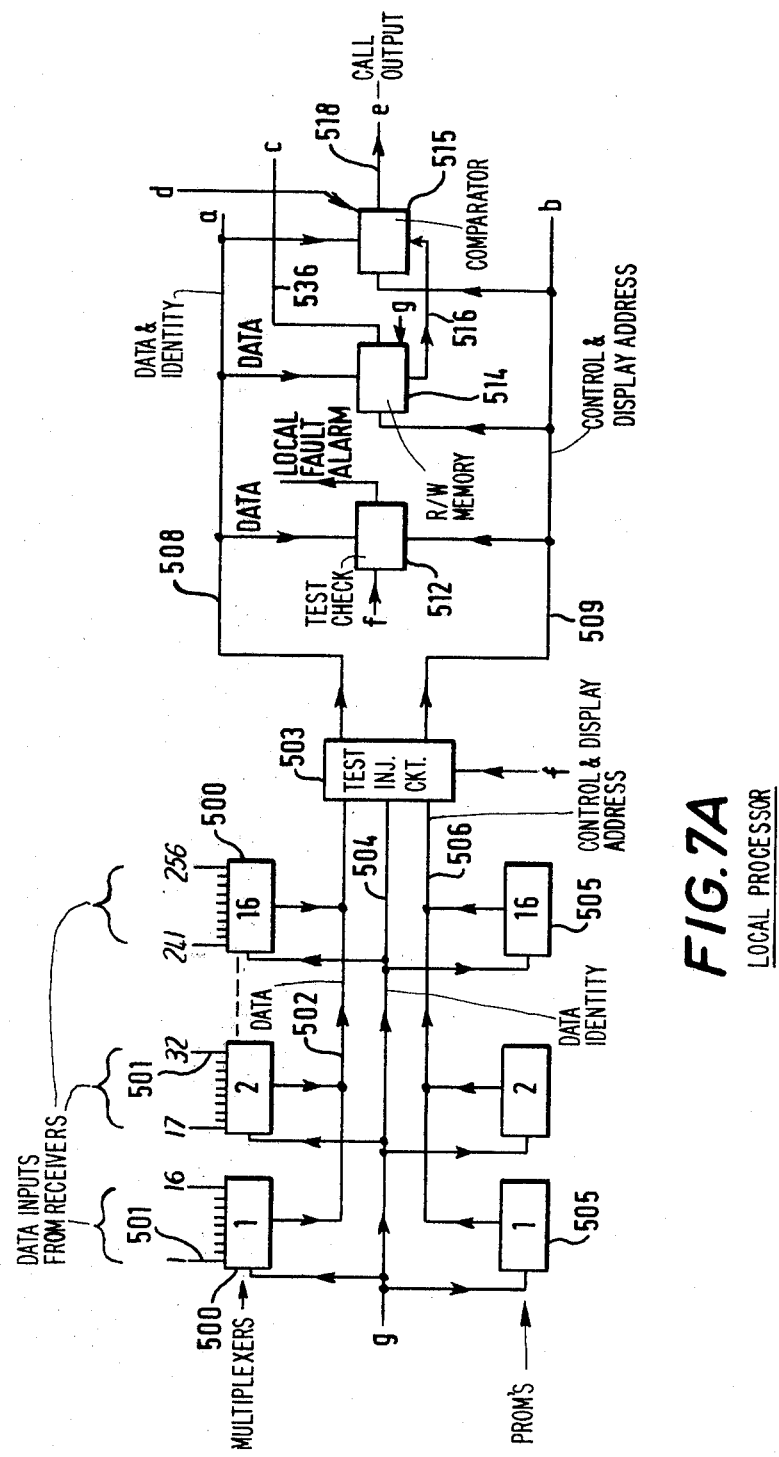
Figure 7B:
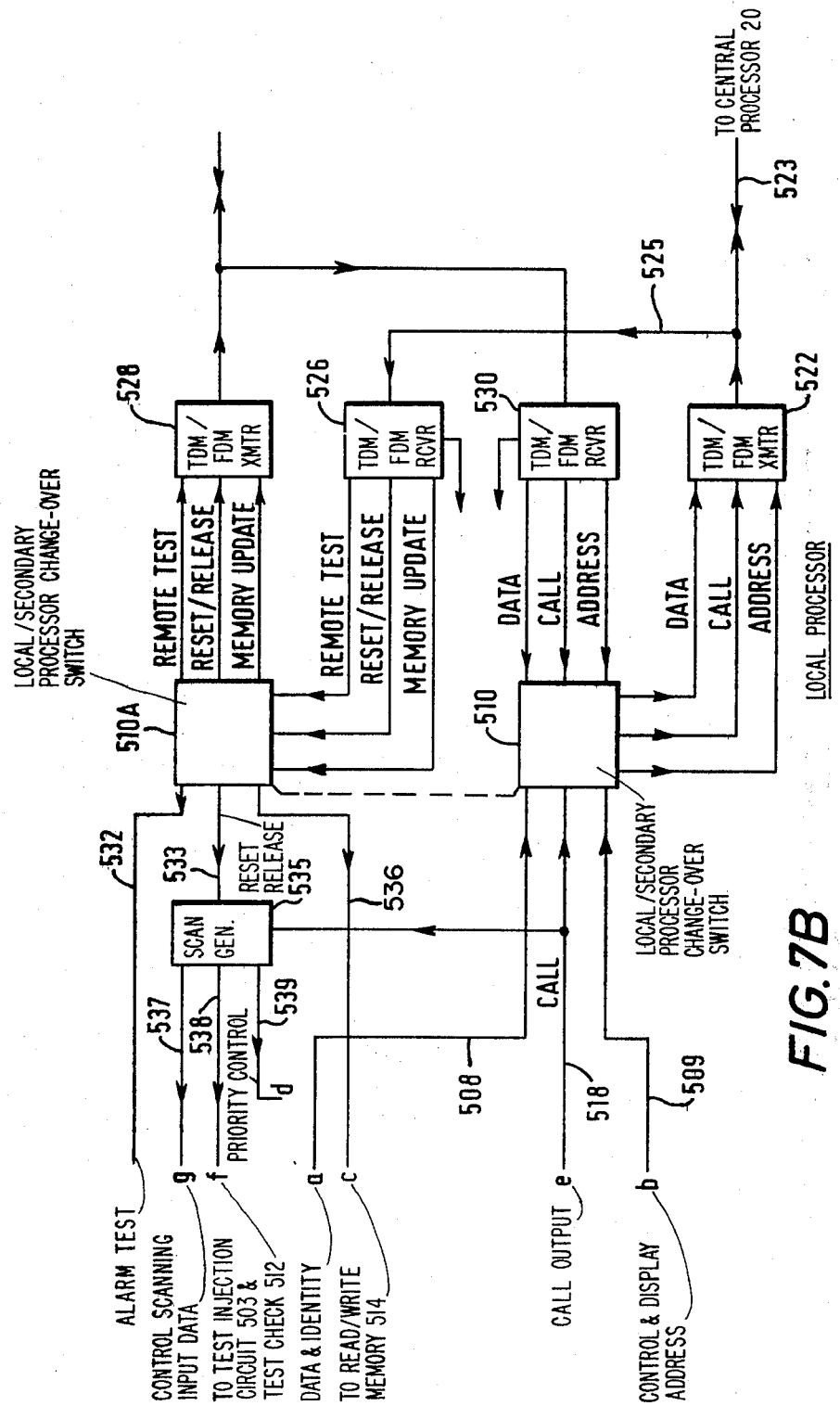
Figure 8A:
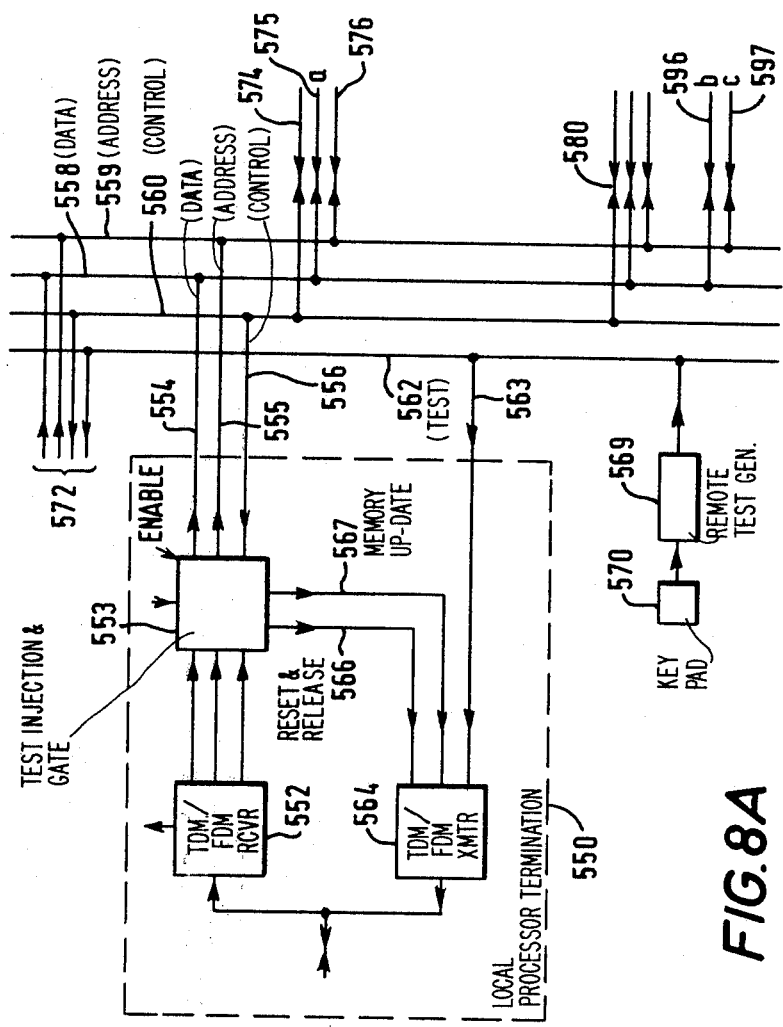

FIGS. 5A, 5B and 5C comprise a circuit diagram showing an alternative form of transmitter;

FIGS. 6A, 6B and 6C comprise a circuit diagram showing a receiver used with the transmitter of FIG. 5;

FIGS. 7A and 7B together are a block schematic diagram of a local processor used in the system of FIG. 1;

FIGS. 8A and 8B together are a block schematic diagram of a central processor used in the system of FIG. 1, and FIG. 9 is a block schematic diagram of terminal station equipment used in the system of FIG. 1.

The signalling system shown in FIG. 1 of the drawings is for transmitting alarm signals from a subscriber's premises via existing telephone lines to one of a number of terminal stations or display locations where the alarm information is required e.g. police, fire, security and plant maintenance organization. The alarm information is transmitted over the telephone lines in encoded form and in such a manner that the signals do not interfere with normal speech signals on the telephone lines.

The system has transmitting equipment located in the subscriber's premises. Two types of transmitting equipment will be described and these are indicated at 10 and 11. Each piece of transmitting equipment 10, 11 is connected via a local public telephone line 12 to an associated receiver 14, 15. The receivers are located in a local exchange and are connected to a processor 16 in that exchange. The transmitter 10 produces a carrier signal on which is modulated alarm information. The modulated carrier is received by the associated receiver which produces an output in the form of single bit binary information which is fed to the local processor 16. The transmitter 10 is designed to operate with a single input from an alarm.

The transmitter 11 is designed to operate with two alarm inputs. The transmitter generates a carrier wave which is amplitude modulated by a combination of three tone frequencies which are switched in order to indicate the state of the alarm contact inputs. The associated receiver responds to the modulated carrier and produces an output in the form of single bit binary information which is fed to the local processor 16. The two types of transmitter and their associated receivers will be described in more detail below.

The system has a number of local exchanges (only one is shown in FIG. 1) each of which contains a number of receivers all connected to a single local processor 16. Each processor 16 is arranged to continuously scan the outputs of the receivers connected to it. Each local processor 16 is connected by a dedicated line to a central processor 20 disposed at a central exchange. When a local processor detects an alarm condition from one of the pieces of alarm equipment it compiles a message containing subscriber identity and destination for the alarm and transmits this message to the central exchange 20. The central processor at the central exchange receives this message and directs it via a private line to an appropriate one of a number of display points 21. The display points can be located at a fire headquarters, police headquarters, or a central display station. A connection can also be provided to a Post Office maintenance point.

Figure 2:
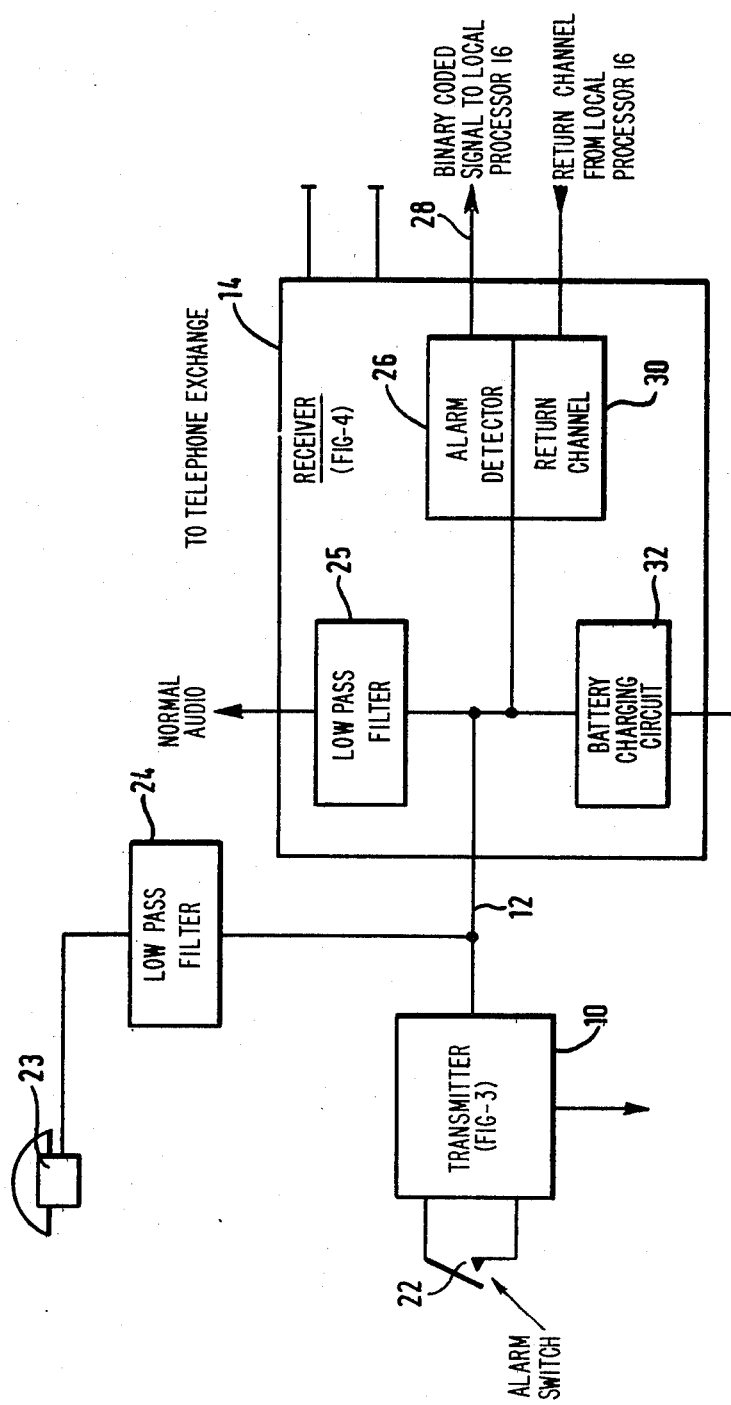
FIG. 2 is a block schematic diagram of one form of transmitting and receiving equipment used in the system of FIG. 1.

Referring now to FIG. 2 which is a block diagram illustrating the transmitter 10 and its associated receiver 14, the transmitter unit is connected to an alarm switch 22 associated with an alarm the condition of which is to be sensed. The transmitter unit 10 is connected to the telephone line 12 which also receives signals from the subscriber's telephone handset 23 via a low pass filter 24. The receiver equipment 14 includes a low pass filter 25 which allows normal telephonic speech information to pass therethrough to the telephone exchange switching equipment. Alarm information from the transmitter 10 cannot pass through the filter 25. The receiver 14 also includes an alarm detector 26 which continuously senses the modulated carrier signal and emits a binary coded signal along line 28 indicative of the state of the alarm being sensed. The line 28 is connected to a local processor 16. The receiver 14 also includes a return channel indicated at 30 which is connected to receive signals from the local processor 16. The return channel is operative when an alarm condition is indicated to transmit a signal back to the transmitter 10 to indicate that the alarm condition has been sensed at the local processor. A charging circuit 32 is provided to recharge a nickel cadmium battery which powers the transmitter 10, the charging current being fed over the telephone line 12 when the line is sensed to be idle.

Figure 3:
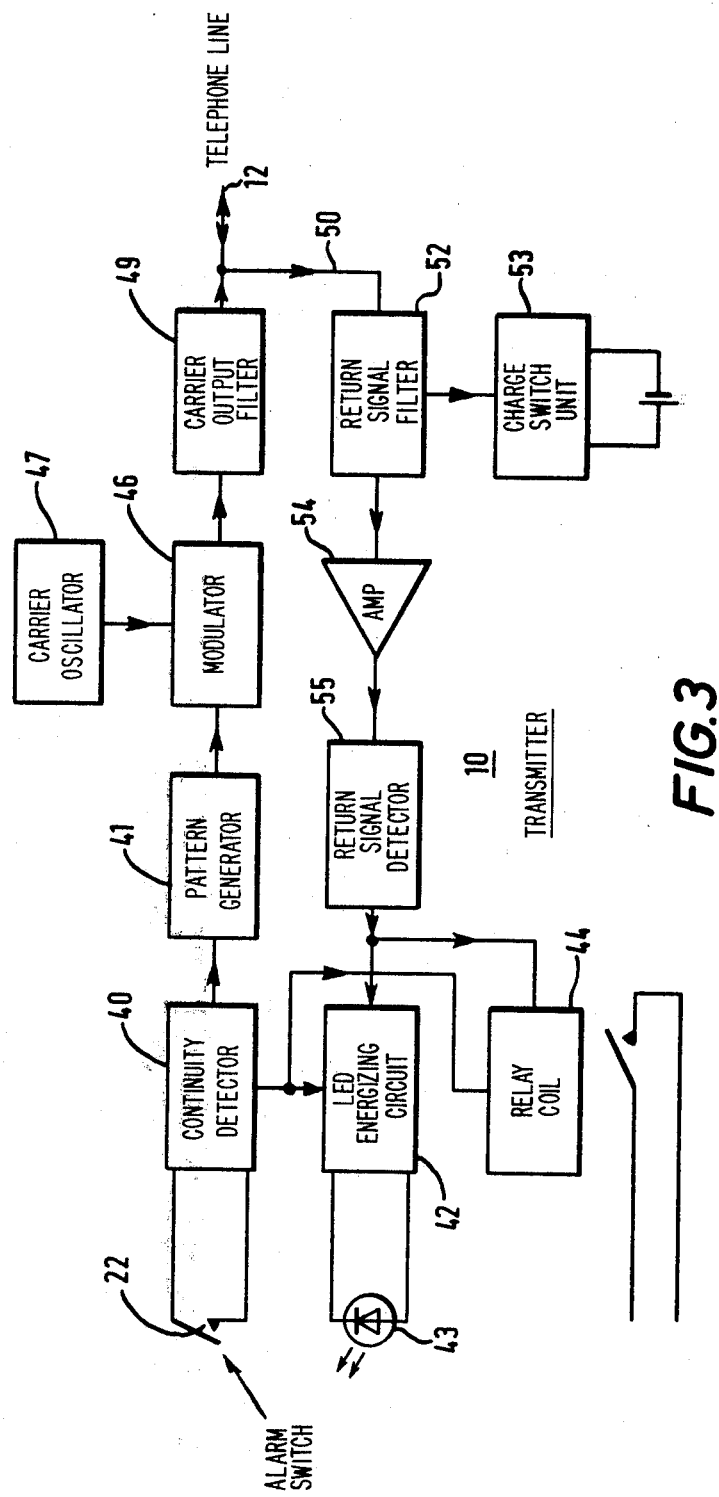
FIG. 3 is a block schematic diagram of the transmitting portion of the equipment of FIG. 2.

Turning now to FIG. 3 the switch 22 of the subscriber's alarm equipment is connected to a continuity detector 40 in the transmitter equipment 10. The continuity detector has three outputs a first of which is connected to a pattern generator 41; a second of which is connected to a light emitting diode energizing circuit 42; and the third of which is connected to a relay 44. The output of the pattern generator 41 is connected to a modulator 46 which receives an input from a carrier oscillator 47. The output of the modulator 46 is connected to a carrier output filter 49 the output of which is connected to the telephone line 12. A return path for signals from the receiver equipment in the local exchange is provided via a line 50 to a return signal filter 52. The return signal filter 52 has a first output which is connected to a charge switch unit 53 and a second output which is connected to an amplifier 54. The output of the amplifier 54 is connected to a return signal detector 55 the output of which is connected to the energizing circuit 42 and the relay 44.

In operation when the alarm is in its non-alarm state the alarm contacts 22 are closed. This state is detected by the continuity detector 40 which triggers the pattern generator 41. The signal from the pattern generator is fed to the modulator 46 and amplitude modulates the carrier signal from the carrier oscillator 47. The modulated carrier is fed to the telephone line 12 via the filter 49. The function of the filter 49 is to remove any side bands which could interfere with other carrier systems and also to prevent any bridging loss on the line at frequencies outside the operating range.

When the alarm switch is operated the input to the unit becomes open circuit. This is sensed by the detector 40 and the modulation is removed from the carrier signal. The unmodulated carrier is detected by the receiver in the exchange as being indicative of an alarm condition. This will be described in more detail below with reference to the receiver unit.

When the receiver in the exchange unit receives an alarm signal it generates a signal which is transmitted back along the line 12 to the transmitter equipment 10. The return signal is fed via line 50 through the return signal filter 52, return signal amplifier 54 and detector 55 to the energizing circuit 42. The energizing circuit 42 responds and causes the light emitting diode 43 to flash. This flashing provides an indication that the alarm information has been received at the exchange equipment.

The battery charging circuit is connected across the line and is automatically disconnected whenever the telephone handset is off hook. When the telephone handset is on hook, a relay in the exchange equipment connects the telephone line to the exchange battery. The subscriber's battery is connected across the line via the charge switch unit 53. Under these conditions the battery is continually charged by a current of about 3 mA.

When the telephone goes off hook, the charge switch unit 53 disconnects the battery from the telephone line and the relay in the exchange unit re-connects the line back into the switching equipment. When the telephone goes back on hook the relay in the exchange unit is operated after about 45 seconds. About 90 seconds later the charge switch unit 53 operates and re-connects the battery to line. These time delays are provided to allow for insulation testing of the telephone line.

Turning now to FIG. 4 each receiver in the local exchange has a carrier input filter 70 which receives signals transmitted along the line 12. The carrier input filter 70 is connected to a carrier pre-amplifier 71 the output of which is connected to a controlled attenuator 74. The output of the attenuator 74 is connected to a carrier amplifier 75 the output of which is connected to a carrier demodulator 76 and to an alarm demodulator 78. The output of the carrier demodulator is connected via a feedback loop including an automatic gain control unit 80 to the controlled attenuator 74. The output of the carrier demodulator 76 is also connected to a level detector 82 which is connected to a carrier timing network 84. The output of the carrier timing network is connected to logic circuits indicated at 85.

The alarm demodulator 78 is connected to a level detector 87 the output of which is connected to an alarm timing network 88. The output of the alarm timing network is connected to the logic circuits 85.

The logic circuits have four inputs 90, 91, 92 and 93. The input 90 is a lamp test input, the inputs 91 and 92 are reset inputs and the input 93 an external return signal enabling input. The logic circuits have a first output 95 which is connected to a light emitting diode 96, a second output 97 which is an alarm output, a third output 98 which is a carrier fail (locking) output, a fourth output 99 which is a carrier fail (not-locking) output and a fifth output 100 which is connected via a return signal oscillator 101 and a return signal filter 102 to the line 12.

The exchange equipment shown in FIG. 4 also includes a low pass filter 105 which is arranged to receive signals from the line 12. The low pass filter is connected to a power switch 106 which is connected to the exchange switching equipment.

In operation signals transmitted along the line 12 are fed to the carrier input filter 70. The filter 70 is designed to transmit only signals having frequencies within a narrow band about the carrier frequency. The signals transmitted via the filter 70 are amplified by a carrier pre-amplifier 71 and then further amplified by an amplifier system consisting of the attenuator 74, the carrier amplifier 75, the carrier demodulator 76 and the gain control 80. The gain of the amplifier system is controlled by the output of the demodulator 76 which has a long time constant associated with it so that it does not respond to the peaks and troughs of the modulation present on the carrier signal. The alarm demodulator 78 on the other hand has a short time constant and its output is simply the modulating waveform. The level detector 82 which receives the output from a carrier demodulator 76 is arranged to respond to the presence or absence of the carrier signal. The detector 87 which receives the output of the alarm demodulator 78 is arranged to respond to the presence or absence of the modulation signal, that is the alarm information from the subscriber's alarm equipment.

The carrier timing network 84 which responds to the level detector 82 is arranged to detect the absence of a carrier. It is so arranged that it does not respond to very short absences of carrier signal. Once it has detected the absence of a carrier signal it does not return to its original state until the carrier is present again continuously for a period of about a second. The alarm timing network 88 responds to the alarm level detector 87 and is arranged to provide rapid detection of an alarm condition but slow recovery from the alarm state once the alarm state has been detected. The outputs from the two timing networks 84 and 88 are fed to the logic circuits 85.

If disappearance of the carrier wave is detected by the detector 82, the two outputs 98 and 99 of the logic circuits 85 switch from a low to a high state. The light emitting diode 96 connected to the output 95 is also illuminated to provide an indication that carrier failure has occurred. Whenever the carrier signal returns after disappearing and is sensed by the detector 82 and its timing network 84, the carrier fail (non-locking) output 99 returns to its low state, but the carrier fail (locking) output 98 does not return to the low state until either the reset input 91 or the reset input 92 is earthed. Similarly the light emitting diode 96 remains illuminated until reset by the application of an earth signal to the input 91.

When an alarm is detected by the detector 87 and carrier failure has not occurred, the output 97 of the logic circuit switches from a low to a high state and remains in that high state until the alarm signal disappears. The alarm output cannot be reset except by the disappearance of the alarm signal. Whenever the carrier fails, the state of the alarm output 97 cannot then be altered until the carrier returns.

The fifth output 100 of the logic circuits controls the return signal oscillator 101. The arrangement is such that whenever an alarm state is recognized the oscillator is switched on automatically so that a return signal is transmitted from the oscillator via the filter 102 to the line 12 and back to the subscriber's equipment to indicate that the alarm signal has been received.

The inputs 90 and 93 of the logic circuits 85 are provided for testing purposes. The input 90 is a lamp test input to test operation of the light emitting diode 96. The test input 93 is for testing operation of the return signal oscillator 101.

The output of the return signal oscillator 101 when enabled under alarm conditions is fed through the return signal filter 102 to the subscriber's line 12. As well as filtering out harmonics from the oscillator signal, the filter 102 reduces the loading on the subscriber's line and the carrier frequency due to the return signal oscillator 101.

The exchange equipment for receiving telephonic speech signals is connected to the subscriber's line and isolated from the carrier frequencies by the low pass filter 105. Normal telephonic speech signals are transmitted along this path.

The function of the power switch 106 is to connect the subscriber's line to a battery in the exchange whenever the handset of the subscriber's telephone is on hook. This allows the charge switch unit in the subscriber's equipment to charge from the battery in the exchange. When the telephone handset is off hook the power switch senses the increased line current and reconnects the subscriber's line to the exchange switching equipment. When the telephone goes back on hook a delay of about 45 seconds is allowed before re-connection of the exchange battery to the telephone line. This time delay allows for insulation testing of the telephone line.

The other version of the transmitting and receiving equipment 11, 15 will now be described with reference to FIGS. 5 and 6. In this version the transmitter generates a carrier waveform which is amplitude modulated by a combination of three tone frequencies which are switched in order to indicate the state of alarm contact inputs. The frequencies of the various signals will not be given for security reasons.

The transmitter operates from mains power and has a reserve rechargeable battery which comes into operation automatically and without interruption of its operation if the mains supply fails. The battery is maintained on a float charge basis.

The transmitter also transmits an indication of either mains failure or battery disconnection and generates local alarm signals if the telephone line fails or if the transmitter is physically tampered with. All these features will become clear from the following detailed description of the transmitter and receiver.

The transmitter equipment is shown in FIG. 5. The transmitter has two alarm monitors 150, 151, the first alarm monitor 150 being connected to a first alarm input connection 152 and the second alarm monitor 151 being connected to a second alarm input connection 154. The alarm monitors are connected to three oscillators 155, 156, 157 which are arranged to generate the three tone frequencies mentioned above. A line monitor circuit 159 is connected to the tone oscillators 155 and 157. The oscillator outputs are connected to a modulator and output stage 161 which is connected to receive a carrier wave from a carrier oscillator stage 160. The output stage 161 is connected via a band pass filter 162 to the telephone line. Power for the circuit is provided from a power supply 165.

As the alarm monitors 150 and 151 are identical only one of these circuits will be described in detail the description also applying to the other circuit. The alarm monitor 150 has four input terminals 170, 171, 172, 173, these terminals being connected to two pairs of alarm contacts. When the alarms are not in operation (normal condition), the alarm contacts are closed and are connected in series with a resistor 174. The contact 170 is connected to the base of a transistor 176. When the alarm contacts are closed this transistor is conductive. The transistor 176 is connected to further transistors 178 and 179 each of which is also conductive when the transistor 176 is conductive. The collector of transistor 179 is connected to a trigger circuit comprising two transistors 180 and 181. The trigger circuit is connected to a further switching transistor 182 which is held in a non-conductive state when there is no alarm condition.

Turning now to the tone oscillators only due to these oscillators will be described in detail since they are essentially the same the only difference being in the values of certain components in order to give different output frequencies. As an example the oscillator 155 which is the lowest frequency tone oscillator is a conventional LC oscillator. It has a transistor 185 whose collector circuit includes an LC circuit. The bias conditions are such that the transistor 185 does not saturate. This makes the output amplitude independent of the supply voltage and improves the frequency stability and reduces the harmonic component especially as the Q of the inductor in the LC circuit is relatively low (about 30).

The temperature coefficient of the inductor in the LC circuit approximately matches that of the polystyrene capacitors used in the circuit. The bias for the oscillator which determines the amplitude of the output is derived from a zener diode stabilized voltage source 190. The bias is controlled through a diode 191 to switch the tone oscillator on or off according to the alarm input from the alarm monitors.

The oscillator 155 is connected to receive the outputs of each of the monitor circuits 159, 151 and 150. A switching transistor 193 is connected between the output of these circuits and the oscillator 155. The oscillator 156 is connected to receive the output of the monitor circuit 151 and the oscillator 157 is connected to receive the output of the monitor circuit 150.

In operation (considering the operation of the monitor circuit 150) if either alarm contact is opened the voltage on the base of the transistor 176 rises so that this transistor is cut off. The transistors 178 and 179 are also cut off. The switching point for these transistors is stabilised by diodes D28 and D29 and protection is provided by diodes D24 and D25. If a short circuit occurs between the two pairs of contacts the voltage on the base of transistor 176 falls so that the transistor 176 saturates. This also cuts off transistors 178 and 179.

Either of these conditions, an open circuit contact or a short circuit constitutes an alarm condition. In an alarm condition the transistor 179 becomes non-conductive as described above and the capacitor 183 charges until the trigger circuit 180, 181 switches state thereby switching on transistor 182. When transistor 182 switches on the bias is removed from the associated tone oscillator. The tone oscillators are switched on or off according to whether alarm conditions exist. The truth table below illustrates the conditions existing for different alarm inputs. The left-hand column of this table refers to A and B alarms, the two alarms.

|  | Tone A | Tone B | Tone C |
| --- | --- | --- | --- |
| A Clear B Clear | On | On | Off |
| A Alarm B Clear | Off | On | On |
| A Clear B Alarm | On | Off | On |
| A Alarm B Alarm | Off | Off | On |

As an alternative to the arrangement described above a two wire alarm circuit with the alarm circuit connected between the terminals 170 and 172 may be employed. A resistor corresponding to the resistor 174 has to be included in the alarm circuit preferably at the most remote point to maintain the balance condition and thus retain the ability to detect both short and open circuit alarm conditions.

It will be noted that the output of the alarm monitor 150 is combined with the output of the line monitor circuit 159 which detects the presence of the exchange battery voltage via resistors 200, 201 if the line voltage drops below approximately 5 volts and alarm A is operated. A relay in the line monitor circuit 150 is energised and a local alarm contact closed. The time constant of the line monitor circuit 159 prevents false operation by the normal use of the associated telephone.

A mains failure monitor circuit 205 is provided. This circuit includes diodes 207, 208 and a tuned circuit consisting of a capacitor 210 and an inductor 211. The diodes 207 and 208 are arranged to square-up the secondary from a mains transformer. The tuned circuit consisting of capacitor 210 and inductor 211 is arranged to pick out the third harmonic of the mains signal at 150 Hz which is supplied as modulating current to the output stage 161. Should the battery become open circuit during mains operation the mains tone is inhibited by a d.c. bias through diode 207 and absence of the 150 Hz modulation at the receiver indicates either mains failure or battery open circuit.

The carrier oscillator 160 is similar to each of the tone oscillators having an oscillator transistor 215 with an LC circuit 216 connected to its collector. Bias for the oscillator transistor 215 is derived from a Schmitt trigger circuit consisting of transistors 218, 219. The oscillator transistor 215 is arranged to be switched off when the battery voltage falls below a certain value. This ensures that the carrier fails before the rest of the circuit malfunctions.

The oscillatory output of the oscillator 160 is fed to the modulator and output stage 161 which is also arranged to receive signals from the three oscillator stages 155, 156, 157. The modulator stage consists of a transistor 222 the base of which receives the output of the oscillator 160. This transistor does not saturate and its output level is determined by the d.c. bias current to the transistor. Amplitude modulation is provided by injecting current from the tone oscillators into the emitter of the transistor 220.

The modulator and output stage has fine adjustment links 224, 225, 226 which can be set to give predetermined outputs from the transistor 222. Once set these fine adjustment links should not require subsequent adjustment.

The collector load of the transistor 222 includes a resonant circuit consisting of an inductor 228 and a capacitor 229. This resonant circuit has a low effective Q due to the damping effect of the load. The output of the transistor 222 consists of a carrier frequency modulated by certain combinations of the tone oscillations depending upon the state of the alarms A and B and the condition of the line monitor circuit 159.

The output stage has a tuned circuit consisting of an inductor 232 and a capacitor 233 which gives both required high out of band impedance and attenuates the out of band frequency components. The inductance 228 forms the line isolating transformer for the equipment. A spark gap 235 and protective zener diodes 236, 237 protect the transmitter from high voltage surges on the line. The output of the transmitter is fed to line via terminals 239, 240.

Returning to the line monitor circuit 159 the exchange battery voltage on the line is fed via resistors 200, 201 to a rectifier bridge 240 and is monitored by a Schmitt trigger circuit consisting of transistors 241, 242. The Schmitt trigger is connected to the base of a transistor 243 the collector of which is connected to the collector of another transistor 244. The base of the transistor 244 is connected to the collector of a transistor 245. If the d.c. line voltage fails whilst transistor 244 is conducting (i.e. during an alarm A condition) the transistor 243 becomes conducting which causes a relay 246 to be energised and this makes a connection between terminals 250 and 251. Capacitors 252, 253 filter out a.c. voltages such as mains hum which may appear on an open line and capacitor 255 prevents operation of the alarm in the event of momentary breaks in the line (e.g. during dialling) or on line voltage reversal.

In the event of removal of the cover of the transmitter unit or removal of the complete unit from say the wall of a building, a micro switch operates to turn off the mains supply to the unit and to close the loop between terminals 256, 257. This simulates an alarm condition.

Power for the circuit is supplied by the power supply 165 which is connected to a mains supply via a transformer 260. The secondary of the transformer 260 is half wave rectified by a diode 261 and smoothed by capacitor 263. Transistors 264, 265 and resistors 267, 268 and 269 form a constant current source supplying current float charge to the battery 270. This current can be adjusted by appropriately selecting the resistor 269. The battery voltage acts as a reference for the supply line through an emitter follower 272. The voltage drop across a diode 273 and a resistor 274 approximately equals a drop across the base emitter junction of transistor 272 and the drop across diode 275. No current flows through a diode 276. The battery charging current is therefore independent of the current consumption of the circuit.

In the mains fail condition the circuit is powered directly from the battery through diodes 276 and a further diode 278. The diodes 273 and 275 protect the charging circuit against voltage reversal during mains failure. If the battery is disconnected the nominal supply will rise until the diode 205 conducts. This limits the voltage to a safe level and also inhibits the 150 Hz signal as described above. The battery can provide at least sixty hours of stand-by power in the event of mains failure.

It will thus be seen that the circuit described above with reference to FIG. 5 produces an output in the form of a carrier wave which is modulated with one or more of three tone frequencies, the particular combination of tone frequencies being indicative of the state of alarms being sensed and of the condition of the power supply.

The receiver unit associated with the transmitter as shown in FIG. 5 is illustrated in FIG. 6. This unit is adapted to receive the carrier signal from the transmitter to detect and decode the amplitude modulated tones and to output the information via logic circuits and light emitting outputs.

The receiver has an input stage consisting of a band pass filter 300. A low pass filter 301 is also connected to the input to provide a path for telephone speech signals to the telephone exchange. This low pass filter 301 filters out the carrier and its modulated tones and allows only speech signals to be transmitted therethrough.

The band pass filter 300 is connected to a pre-amplifier 303 the output of which feeds an automatic gain control amplifier and AM detector 304. The output of the amplifier and detector unit 304 is connected to a carrier level detector 306 which is connected to a carrier level timer and logic driver 308. The carrier level detector 306 also has a connection to a tone amplifier 309. The output of the tone amplifier is connected to a series of tone filters indicated generally at 311 and the output of the logic drivers 308 is connected to control logic indicated generally at 312.

The band pass filter 300 terminates the telephone line. It consists of a transformer 315, inductors 316, 317, 318, 319 and capacitors 320, 321, 322, 323 and 324. The inductor 316 and capacitor 320 form a series tuned circuit and the inductor 319 and capacitor 324 form a parallel tuned circuit. Both of these circuits are tuned to the frequency of the carrier signal. The transformer 315 is designed to provide a predetermined impedance transformation and its secondary circuit which includes the capacitor 321 is tuned to the carrier frequency. The circuits consisting of capacitor 322 and inductor 317 and that consisting of capacitor 323 and inductor 318 are tuned to predetermined frequencies.

Protection against both series and common mode line transient signals is provided in three stages. The first stage is provided by a gas filter spark gap 328 which limits the line voltage transients to predetermined values. The second stage of protection is provided by two back-to-back diodes 330 and 331 which limit the voltage across the line transformer 315. Thirdly the line transformer 315 is proved to a predetermined voltage between its primary and secondary.

The pre-amplifier 303 consists of an integrated circuit 334 with a feedback consisting of resistors 335 and 336 to give the amplifier a predetermined gain.

The automatic gain control amplifier consists of transistors 340 and 341 and an integrated circuit 342. The amplifier 342 has a feedback arrangement to set the gain to a given value. The amplifier arrangement includes an input level control consisting of resistor 344, resistor 345, resistor 346, and the transistors 340 and 341. This input level control arrangement attenuates the signal level into the non-inverting input of the amplifier 342.

The output from the amplifier 342 is fed to the AM detector consisting of diodes 348, 349. The output of the detector is fed back to the attenuator consisting of resistors 344, 345 and 346 and associated transistors 340 and 341. The feedback is via resistors 350, 351 and capacitors 352, 353 which smooth the detected signal and introduce a time delay to retard the response time of the control circuit.

The detector also includes capacitors 356 and 357 and a resistor 358. The diodes 348, 349 full wave rectify the level control signal from the amplifier 342. The values of capacitor 351 and resistor 358 are selected to remove the carrier frequency components from the rectified signal but to leave unattenuated amplitude variations below a given frequency.

The output of the AM detector is also fed to the carrier level detector 306. This circuit is arranged to change state if the carrier level from the circuit 304 increases or decreases beyond certain predetermined limits. The carrier level detector includes an emitter follower transistor 360 which is arranged to buffer the signal from the circuit 304. The emitter of the emitter follower 360 is connected to a smoothing circuit consisting of capacitors 362, 363 and resistors 364, 365. The signal from the emitter follower is smoothed by this smoothing arrangement and applied to the inverting input of an operational amplifier 367 and to the base of a transistor 369. Under normal conditions the amplifier 367 is biassed such that its output is low and the transistor 369 is in a non-conductive state. If the level of the signal from the circuit 304 decreases the voltage at the inverting input of the amplifier 367 falls below its reference voltage and the output of the amplifier 367 changes to a high state. The reference voltage is increased by the action of a positive feedback applied by a resistor 370 and the signal level must now be increased a certain amount in order to restore the circuit to normal.

If the signal level from the circuit 304 increases the transistor 369 becomes conductive and thereby raises the reference voltage at the non-inverting input of the amplifier 367. The voltage at the inverting input also rises until it is clamped by a diode 372. The voltage at the non-inverting input continues to rise and eventually the output of the amplifier 367 switches to a high state. In this state the positive feedback has negligible effect. Thus it will be seen that changes in carrier level are indicated by changes in the output level of the amplifier 367.

The tone amplifier 309 receives signals from the emitter follower 360 via a capacitor 375. The tone amplifier consists of an operational amplifier 376, resistors 377, 378, 379, 380' and 381'. The resistors 380' and 381' are selected to give the amplifier a predetermined gain. A potential divider provided by the resistors 377 and 378 biases the input of the amplifier to set the output at a given value with respect to the supply rail in order to give symmetrical limiting at large signal inputs.

The output from the amplifier 376 is fed to the tone filters 311. There are four tone filter circuits 380, 381, 382 and 383. The filters are of essentially similar construction each including an integrated circuit and associated which form a bi-quadratic band pass filter. The filters 380, 381 and 382 are tuned to a respective one of the tone frequencies described above whilst the filter 383 is tuned to the 150 Hz mains tone. Thus, each filter is designed to select its particular tone frequency and to apply it to a respective logic driver circuit 388, 389, 390, 391. To increase the gain of each filter feedback is provided from a potential divider on its output.

There are four logic drivers 388, 389, 390, 391, one each associated with one of the tone filters 380 to 383. As the logic drivers are essentially identical only one 388 will be described in detail. The logic driver 388 consists of a pair of transistors 393 and 394, resistors 396 to 403 and two capacitors 405 and 406. The input from the tone filter 380 is via resistor 403 whilst a second input is provided from the carrier level detector 306 via resistor 401. The input current through the resistor 401 biases the output from the tone filter 380 to vary the level at which the logic drive circuit 388 switches. When the carrier level at the output of the automatic gain control amplifier 304 is low the amplitude of the tone signal at the output of the tone filter 380 is low and the bias current to offset the input is low. When the carrier level is high the amplitude of a tone signal from the tone filter 380 will be high and the bias current to the tone filter is increased. This modifies the switching level and a larger signal amplitude tone is required to operate the switch. The transistor 393 is arranged to change from a non-conductive to a conductive state on the negative going peaks of the input signal. The transition to a conductive state is delayed by the time taken for the capacitor 405 to charge via the resistor 402 to a level at which the output transistor 394 becomes conductive. When the collector voltage of the transistor 394 falls to a logic 0 level, the output of gate 404 goes high applying a positive feedback via capacitor 406 and resistor 396 to the base of the transistor 394 to give a rapid switch. When the signal from the tone filter 380 falls to a level such that the negative peaks do not cause the transistor 393 to become conductive the capacitor 405 discharges via resistors 398 and 397 and the base of the transistor 394. When the current through the base has dropped sufficiently to cause the collector voltage to rise to a logic 1 level the output of the gate 404 goes low. The positive feedback applied to the transistor 394 again ensures a rapid switching.

The resistor 399 is provided to apply positive feedback to the input of the logic driver circuit to give a small amount of hysterisis.

The above description also applies to the other logic driver circuits 389, 390 and 391.

The outputs from the logic driver circuits 388 to 391 are fed to the control logic 312. The control logic also receives signals from the carrier level timer and logic drivers 308. This circuit 308 consists of transistors 410, 411 and associated components and is designed to give an output to the logic control circuit 312 when a carrier abnormal condition is sensed. When the carrier signal is normal the output from the comparator 367 is low and transistors 410 and 411 are conductive. The output at the collector of transistor 411 is indicative of a logic 0. When the output from the comparator 367 is high a diode 412 limits the emitter-base reverse bias voltage of transistor 410. The transistor 410 and 411 do not conduct and the output at the collector of the transistor 411 is a logic 1. This is indicative of a carrier abnormal condition. The output from the transistor 411 is fed via a line 412 to the control logic 312.

The circuit 308 also has a delay arrangement in order to prevent interruptions in the carrier signal of less than 300 ms causing a carrier fail output. The delay provided is approximately 380 ms. This circuit consists of transistors 415, 416, resistors 418 to 422, a diode 423 and a capacitor 424. When the output from the carrier detector is low (normal condition) capacitor 424 is discharged via resistor 422, diode 423 and transistor 410. The potential divider resistors 419 and 420 establish a potential on the emitter of transistors 415 such that the transistor 415 and the transistor 416 are not conducting. The output from the transistor 416 at its collector is indicative of a logic 1. When the output from the carrier detector goes high (indicative of carrier fail condition) transistor 410 becomes non-conductive, diode 423 is reversed biased and the capacitor 424 charges via the resistor 421. When the voltage across the capacitor reaches a certain level the transistors 415 and 416 become conductive and the output of the collector becomes low indicative of logic 0. This is indicative of a carrier fail condition and is fed to the control logic 312. It will be seen that there is a delay provided by the capacitor 424 and resistor 421 before the signal indicative of a carrier fail condition is emitted.

The outputs from the three logic drivers 388, 389 and 390 associated with the tone filters 380, 381 and 382 are connected to a network of decode gates 429 to 437. The arrangement of the decode gates is such that when a gate decodes an alarm state its output is low. The following table illustrates the condition of the outputs of the decode gates for various states of the three signalling tones listed as tone A, tone B and tone C. The final column of the table indicates which alarm is on. It should be noted that alarm state C is inadmissible. The four decode gates which decode alarm C are combined by a NAND gate 438 and a logic high at the output of this NAND gate indicates C alarm state.

| State of signalling tones | | | Decode Gate | |
|---|---|---|---|---|
| Tone A | Tone B | Tone C | output low | Alarm ON |
| On | On | Off | — | Nil |
| Off | On | On | 432 | A |
| On | Off | On | 433 | B |
| Off | Off | On | 432 & 433 | A & B |
| On | On | On | 434 | C |
| Off | Off | Off | 435 | C |
| Off | On | Off | 436 | C |
| On | Off | Off | 437 | C |

The output of the gate 432 is applied to a latch 440 which inhibits the change of state on the output in the event of a carrier abnormal signal being present. A signal indicative of an A alarm is fed to an A alarm output 441 and is buffered by way of the collector gate 442. A similar arrangement is provided for the B alarm by way of a latch 444, a buffer 445 to the B alarm output 446.

When A or B alarms are operated, logic levels indicating a C alarm will be present before the logic levels indicating the removal of an A or B tone have been signalled. This condition is due to circuit delays. To prevent this transition state from indicating a spurious C alarm, the logic 1 output of the gate 438 must be inhibited for 250 ms. Now the C alarm decode gate 438 goes high for an alarm state which triggers a monostable 448 and the output goes to a low state. A delay formed by resistor 450 and capacitor 451 holds a logic 0 on the output of a gate 452 for the duration of the propagation delay of the monostable 448 thus preventing a momentary output from the gate 452. A resistor 454 and a capacitor 455 set the monostable delay to 250 ms. After this time the $\overline{Q}$ output of the monostable 448 goes high and via the gate 452 and a further gate 457 a C alarm output signal appears at the C alarm output 459.

The carrier fail signal from the circuit 308 is fed to a logic gate 461. A carrier fail alarm is represented by a logic 0 at the input to the gate 461. This gives a logic high at the carrier fail output 463 by way of gate 464 and gate 465. An alarm condition exists when the carrier fail delay circuit in circuit 308 is indicating a low carrier level or when a C alarm is present.

Conditions that give a non-locking alarm set a bistable 468. The bistable 468 controls the signal on an output 470 via an inverter consisting of gates 471 and 472. A carrier fail condition is indicated by a high level on output 470. The bistable 468 can be reset by applying a logic 0 to a reset input 474 or a reset input 475.

Visual indication can be provided using a light emitting diode 476. This light emitting diode is energised via a bistable 478 which receives the carrier fail signal via gate 464. The bistable 478 can be reset via the reset input 474. A lamp test input 479 is connected to the light emitting diode 476 via a diode 481. The diode 481 conducts when the lamp test input goes low lighting the diode 476 and thereby providing a test of its operation.

Mains failure indication is controlled by bistable 485 which receives signals from the logic driver 391. The output state of the bistable prior to a carrier fail indication is held by a latch 487 during a carrier fail condition. During a carrier fail indication a gate 488 inhibits the input to the bistable 485. Operating a reset terminal 489 clears the bistable 485 at any time. The logic output signal indicative of mains failure is applied to an output 491 via a latch 492 and a buffer gate 493. The condition at the input to the latch 493 prior to a carrier fail indication is held by the latch during a carrier fail condition. Visual indication of a mains failure is provided by a light emitting diode 495. This can be tested by applying a test signal to the test terminal 479 which renders a diode 496 conductive so that the lamp 495 is illuminated to test its operation. This test operation does not require setting of the bistable 485.

Each receiver output is connected to an input of a local processor 16 (FIG. 1). Each local processor 16 can accept a maximum of 1024 data inputs. The local processor can be split between two exchanges where circumstances dictate, the two parts of the processor being connected in tandem. One part of the processor is then known as the primary local processor and the other part the secondary local processor. The construction of each local processor is shown in FIG. 7.

The processor shown in FIG. 7 has an input stage consisting of 32 multiplexers 500 to which the data inputs from the receivers are connected in blocks of 16 indicated at 501. The data output of each multiplexer 500 is connected to data highway 502 which leads to a highway test injection circuit 503. Each multiplexer 500 also has a connection to a data identity highway 504 which leads to the circuit 503. The input stage also includes 32 programmable-read-only memory circuits (PROM) 505 which can receive signals from the highway 504 and which have outputs to the circuit 503 via a control and display address highway 506. In the present embodiment the memory circuits 505 consist of mechanical on/off switches. The functions of the memory circuits 505 are:

(a) to label the data inputs with the binary coded address of the terminal at which the message is to be displayed.

(b) to permit the data inputs to be handled in pairs or blocks of 4.

(c) to determine if selected data is to be routed to both the display terminal nominated by the binary address of (a) and a Post Office maintenance terminal or to the nominated terminal only. For data required at only the Post Office maintenance terminal (e.g. fault and test data) the message is addressed to that terminal by a nominated binary address code.

The highway test injection circuit 503 has two output highways 508 and 509 leading therefrom, the highways 508 and 509 being connected to a local/secondary processor changeover switch 510. The highway 508 is a data and indentity highway and the highway 509 is a control and display address highway. Connected across the highways 508 and 509 are a highway test check circuit 512, a read/write memory 514 and a comparator 515. The memory 514 has a memory output 516 which is connected to the comparator 515. The comparator 515 has a call output 518 which is connected to the switch 510.

The switch 510 has an output connected to a TDM/FDM (time division multiplex/frequency division multiplex) transmitter 522 which is connected via a line 523 to the central processor 20. A return path from the central processor 20 is provided via a line 525 and a TDM/FDM receiver stage 526 to a switch 510A which is coupled to the switch 510. The switch 510A is connected to a TDM/FDM transmitter 528 which is connected to the secondary local processor. Signals received from the secondary local processor are fed via a receiver stage 530 to the switch 510.

The switch 510A has a first output 532 whose function will be described, a second output 533 which is a reset/release for a scan generator 535 and a third output 536 connected to the read/write memory 514. The scan generator 535 is connected to the output 518 of the comparator 515. The scan generator 535 has three outputs 537, 538 and 539. The output 537 is connected to the highway 504 to control scanning of the input data and to the read/write memory 514 so that the memory can be scanned in synchronism with the input data; the output 538 is connected to the highway test injection circuit 503 and to the highway test circuit 512; and the output 539 is a priority control output which is connected to the comparator 515.

In use binary data input to the multiplexers 500 is scanned under the control of the comparator 515 and the priority control derived from the scan generator 535. The data inputs are scanned a total of four times in a complete scan sequence which is the normal condition when no alarm signals are transmitted. The first scan is used to check the various information highways, the second scan examines the first data bit of either the data pairs or blocks of four, the third scan examines all other data inputs, and the fourth scan determines those messages to be duplicated to the Post Office maintenance terminal.

The first scan or highway test sequence establishes that the data, data indentity and control and address highways 502, 504, 506, 508 and 509 are functioning correctly by injecting a test signal from the scan generator 535 at the highway test injection circuit 503 and checking the validity of the data in the highway test check circuit 512. During the subsequent three scans the data input multiplexers 500 and their associated PROM's 505 are scanned in sequence under the control of the scan generator 535. As each data input is switched to the data highway 502 it is compared with the contents of the read/write memory 514 which is scanned in synchronism with the data inputs. The contents of the read/write memory 514 are the data inputs from the previous scan sequence. Each data input is uniquely identified by the binary scan used to switch the multiplexers 500.

If no alarm signals are being transmitted the local processor continuously scans the data inputs. Whenever a difference is detected between the input data and the data contained in the memory 514, the comparator 515 stops the scan on that data input and signals a call to the changeover switch 510. This call signal locks the changeover switch 510 onto the local processor and loads data, call and address information into the TDM/FDM transmitter 522 for onward transmission to the central processor 20. When the central processor 20 has examined the message signals, control signals are returned to the local processor. If the message is accepted by the central processor 20 the read/write memory 514 is up-dated to the current state of the data input being examined. The scan generator is then reset to the first of its scans in a scan sequence and is released and the call signal removed. This releases the changeover switch 510 which can then accept another message from either the primary or secondary processors.

If however the message is not accepted by the central processor 20 the return signal on line 525 only releases the scan generator and removes the call signal. The memory 514 is not up-dated and since the scan generator is not reset it continues to examine the remaining data inputs in sequence. The next data change accepted by the central processor then initiates a highway test followed by re-examination of the data inputs on the second scan of the scan sequence.

Two forms of testing are available in the local processor. The first test is the highway test which is local to each processor and tests that each line in each highway can be switched from logic 1 to logic 0 when the multiplexers 500 and PROM's 505 are inhibited. If the highway test fails further scans of data are inhibited and a local fault alarm is outputted from the processor. This alarm condition is also passed to the Post Office maintenance terminal by the TDM/FDM transmission arrangement.

The second test is a remote test which is generated at the Post Office maintenance terminal and signalled via the central processor to all local processors. It generates an alarm (logic 1) data input at a specified input to a selected local processor by way of the switch 510A and output line 532 from this switch. The local processor responds and signals this alarm to the Post Office maintenance terminal. Correct receipt of this message initiates transmission of a clear (logic 0) data signal to the local processor which should in turn be signalled back to the Post Office maintenance terminal. Provision is made to access each local processor in turn either automatically or by manual operation in order to perform testing or local control functions including customer interrogation.

Electrical security in the local processors is achieved by diversification of power supplies. The arrangement is such that each power unit feeds a limited number of receiver units and their associated multiplexers 500. Failure of one power unit is signalled via a separately powered data multiplexer to the Post Office maintenance terminal and does not affect the remaining inputs to the local processor. Failure of power to the common equipment is catastrophic. This is indicated at the central processor 20 as a failure of the TDM/FDM link to the local processor. Duplicated transmission paths are provided between local and central processors with automatic changeover and alarm facilities and the TDM/FDM links have both parity and signal level monitors. The restoration of a power supply can only be achieved by following a prescribed routine which ensures that false alarm conditions are not generated when power is re-applied. The circuits are mounted on plug-in units all of which incorporate a U-link connection whereby removal of any item causes an alarm to be outputted.

The operation of the secondary local processor is substantially identical with that of the primary local processor, the exception being the changeover switch operation. Instead of feeding a changeover switch, the data, call and address information is fed directly to a TDM/FDM transmission link the output of which is connected to the changeover switch in the primary local processor. Information returned from the central processor first passes through the changeover switch and is then retransmitted to the secondary processor. The changeover switch is held locked to the secondary processor until the call signal is removed.

Each local processor is connected to the central processor 20 (see FIG. 1). A maximum of 30 local processors can be connected to the central processor. The function of the central processor 20 is to identify call signals originating from the local processors or display points, to route the message to the display termination identified by the binary address code, check that the display termination is free to accept the message and return control information to the local processor originating the call. The central processor is shown in block schematic form in FIG. 8.

Referring to FIG. 8 the central processor comprises a plurality of local processor terminations 550 (only one shown in FIG. 8), a local processor termination being provided for each local processor. Each local processor termination comprises a TDM/FDM receiver 552 connected to receive signals from the local processor. The receiver 552 is connected to a test injection and gate circuit 553. The circuit 553 has data, address and control outputs 554, 555, 556 which are respectively connected to a data highway 558, an address highway 559 and a control highway 560. A remote test highway 562 is connected via a line 563 to a TDM/FDM transmitter 564 in the local processor termination 550. The test injection and gate circuit 553 is connected by a reset and release line 566 and a memory up date line 567 to the transmitter 564. A remote test generator 569 is connected to the remote test highway 562 and is operable by means of a key pad 570. The key pad 570 and remote test generator may be located at a Post Office maintenance terminal.

It will be appreciated that all other local processor terminations are connected to the highways 558, 559, 560 and 562 in a similar manner. This is indicated generally at 572. The control data and address highways 560, 558 and 559 are connected by control data and address lines 574, 575 and 576 to a display termination 578. Only one display termination is shown in FIG. 8 but a plurality of other display terminations may be connected to the highways 558, 559, 560 as indicated at 580. A maximum of 30 display terminations can be connected to the main highways. Each display termination has a test, check and store 582 which is connected to the lines 574, 575, 576. The test, check and store has data, call and reset outputs connected to a TDM/FDM transmitter 584 the output of which is connected by a line 585 to a display point. The test check and store 582 has a local test input 586 and a reset input 587 which is connected to an FDM/TDM receiver 588 which receives signals returned from the display point along line 585. The receiver 588 is also connected to the transmitter 584. The receiver 588 has call and address outputs which are connected to a test, injection and gate circuit 589 which has reset/repeat, data and address outputs connected respectively to the lines 574, 575 and 576. The gate 589 has a local test input 591 and an enable input 592. The gate 589 also has a data input from the data output of the store 582 and a control output which is connected to a reset input on the test, check and store 582.

The central processor also includes a test arrangement consisting of a highway test check circuit 595 connected by data and address lines 596 and 597 to the data and address highways. The output of the circuit 595 is connected to a scan generator 599 which in turn is connected to a test sequence generator 600. The scan generator 599 also receives outputs from highway test check circuits of other stages indicated at 601. Thus the scan generator 599 and test sequence generator 600 are common for all the display terminations.

The operation of the central processor is cyclic, the operation of the scan generator 599 being stopped only under fault conditions. All messages are therefore given equal priority. In use information received from a local processor is presented to the receiver 552 and gate 553 of the corresponding local processor termination from the output of the FDM/TDM link. The arrangement is such that the terminations 550 are enabled sequentially by means of signals derived from the scan generator 599. The scan generator 599 also generates local test control signals and a binary code to identify the local processor termination being examined. The enable signal generated by the generator 599 initially causes the gate 553 to generate test signals which are passed to the data and address highways 558 and 559. The test signal validity is checked by the local test check circuit 582 associated with the display termination 578 and a separate check circuit 595 connected directly to the highways. Then the gate input is examined to see if a call signal is present. If a call signal is present the data and address information is switched onto the highways for the remaining period of the enable signal.

Each display termination store 582 is programmed to recognize a specific address code. The display termination which recognizes the address code received from the local processor then tests to see if the store is empty or full. If the store is empty the data is loaded into the store and control signals are returned to the local processor termination which then signals memory up date and reset/release to the local processor. A circuit within the local processor termination 550 ensures that once a call signal has been identified by the central processor it will on subsequent scans be ignored until it has been removed and re-established by the local processor. This is to ensure that the same message is not repeatedly loaded into the display termination 578.

Should the store 582 be full, control information is returned to the local processor termination which then signals only release to the local processor and a flag is set in the store to indicate that a further message is waiting to be displayed. With the data loaded into the display termination store 582 the data together with a call signal is transmitted via the TDM/FDM link 584 to the display point. When the display point has recorded the message and acknowledgement signal is returned along line 585 to the receiver 588 in the display termination. A reset signal is then applied from the receiver 588 to the reset input 587 of the store to clear the store. The display is also subsequently cleared.

If it is required to transfer a message to a second display point the address of the selected new display and a call signal are returned to the display termination 578 in place of the acknowledgement signal. The data output from the store 582 is hard wired to the input of a gate which performs in a similar manner to a local processor termination gate. When this gate is supplied with call and address signals it is enabled in the same manner as a local processor termination gate and passes information onto the data and address highways 558, 559. If the second display termination is free the message is loaded into the new store and control signals return to reset the original display store and cancel the call and address signals for the original display point. If the second display termination is full a control signal is returned to the original display point to regenerate the call signal.

The testing facilities of the central processor will now be described. A local test which is operative during the first part of an enable period inhibits normal operations of the gates and causes them to apply logic 1 followed by logic 0 to each line of each highway. The test check circuits are enabled during this period and any line which fails to signal the logic levels in the correct sequence at the correct time causes the test check circuits 595 and/or the test check and store 582 to output local alarm signals and stop further input gates being enabled by the scan generator 599.

Remote testing of the local processors covers the operation of most parts of the central processor. Each display point can also generate a test message to a predetermined local processor which will check the operation of that display point central processor termination together with the display point itself.

Power supply arrangements for the central processor are similar to those in the local processor. A failure of one power supply (other than that feeding the common equipment) only inhibits one part of the system. All plug-in items incorporate a U-link connection so that the removal of any item causes an alarm output.

FIG. 9 illustrates the functional blocks of a display point 21. The display point is connected to receive TDM/FDM signals from the central processor via line 585. The display point has an FDM/TDM receiver 610 which receives the signals from the central processor. The receiver 610 has a data output line 611 which is connected to the data inputs of a visual display 612 and a printer 614. The receiver also has a call output 616 which is connected to the load input of the visual display 612, the load input of the printer 614 the set input of a visual alarm 618 and the set input of an audible alarm 619. The receiver 610 also has an output to a message waiting circuit 620. The receiver has acknowledge and control outputs indicated generally at 622 which are connected to the reset input of the display 612, the print input of the printer 614 the reset input of the alarm 618 and the reset input of the alarm 619. A local test circuit 624 is connected to the visual display 612. The line 622 from the receiver 610 is connected to the transfer reset/repeat input of an acknowledge and transfer control circuit 626 which also has an enable input connected to the visual alarm 618. The circuit 626 also receives signals from a transfer address PROM 628. The acknowledge and transfer control circuit 626 has acknowledge transfer address and call outputs which are connected to a TDM/FDM transmitter 630 the output of which is connected to the line 585 to the central processor. The transmitter 630 also has an input from a system test circuit 631.

In operation on receipt of a call signal from the central processor, data is loaded into the visual display 612 and the printer (if present) 614. The visual alarm 618 also responds by flashing and the audible alarm circuit 619 emits an audible alarm to attract the attention of an operator at the display point. The visual alarm also enables the acknowledge and transfer control circuit 626. When the action required by the message has been decided by the operator either the acknowledgement or one of the transfer keys of the circuit 626 is operated. Operation of the acknowledgement key causes the message stored in the central processor 20 to be cancelled and when returned to the display point the acknowledgement signal cancels the visual display, audible and visual alarms and causes the printer to print the received message. Operation of one of six interlocked transfer keys associated with the circuit 626 signals call and transfer address to the central processor and removes the audible alarm. The transfer address is read from the PROM 628 which is housed within the visual display. The central processor treats the call in the same way as a local processor call. If the central processor 20 is able to load the message into the new display store a control signal is returned to the display point which cancels the visual display, visual alarm and call and address and causes the printer to operate. If the new display store is full the control signal returned to the display point causes the call signal to be regenerated. Should the transfer fail (for example because the second display point is faulty) the message can still be accepted at the originating display by operating the acknowledgement key of the circuit 626. The message can only be transferred once by any one display point. The second display point can however re-transfer the message if required. Although in practice only six transfer keys are provided with the circuit 626 any of the other display points may be addressed and the number of transfer keys increased if required.

Two forms of testing facility are available at the display point. The first is a local test controlled by a circuit 624. Operation of a local test key causes the visual display 612 to step all digits in parallel from 000000 to 999999 at approximately 1 second intervals. This is to check that all seven segments display elements are operating correctly. The key also lights all indicator lamps while it is depressed.

The second is a system test and this generates a test message at a nominated local processor. This is controlled by the system test circuit 631. Correct receipt of the message at the display point provides an overall check of local and central processors and the display equipment. Both test functions are available at any time when the display point is not in receipt of a message.

Turning now to the message assembly and display format, a typical message from a local processor 16 programmed to examine input data in a block of four bits would be

231244 ABLP

The two most significant digits of this message indicate the identity of the local processor from which the message originates and are derived from the scan generator in the central processor 20. The next most significant digit indicates primary or secondary processor and is derived from the position of the local processor change-over switch. The three least significant digits define the position of the data inputs on the data multiplexer 500 and are derived from the local processor scan generator. The four alpha characters relate to the four data bits being examined. An alarm condition is shown as the alpha character and the clear conditions as a bar.

For a message where only two data bits are examined the alpha characters B and P are not displayed. Various options are available in the printer mechanism but all give the same display format.

| 231244 ABLP | 35 | 11.46 | ACK | 11.48 |
|---|---|---|---|---|
| (1) | (2) | (3) | (4) | (5) |

Item (1) is the message identity and alarm condition.
Item (2) is a running message log up-dated by one for each message received and reset to 00 at 24.00.
Item (3) is the time at which the message was received at the display terminal.
Item (5) is an indication that the message has been locally acknowledged. For various transfer conditions separate alpha numerical codes are displayed.
Item (5) is the time at which the acknowledgement (or transfer) was effected.

The printer 614 incorporates a self contained real time clock but provision is made to inject external 1 minute pulses if required.

It will be appreciated that several options are available at display points. Although the arrangement shown in FIG. 9 has only one display equipment provision is made to connect two terminals in parallel. The modes of operation are
(a) both working
(b) one working, one stand by.

Interlocks prevent both units being switched to stand by and should the working unit be disconnected the remaining device switches to the working mode. Disconnecting both units (or one where no stand by unit is provided) signals a fault condition to the central processor 20. The display may be either visual only or visual and printer. Alternatively the FDM/TDM system may be interfaced to a computer.

We claim:

1. An alarm system for transmitting alarm information to desired terminal stations via telephone lines comprising:
a plurality of transmitters which are located at telephone subscribers' premises, each transmitter having an alarm circuit associated therewith and being adapted to transmit signals indicative of the state of its associated alarm circuit to a telephone line, said signals being in the form of modulated carrier waves,
a respectively corresponding plurality of receivers located at one or more local telephone exchanges, each receiver being associated with a respectively corresponding transmitter for receiving the transmitted signals therefrom,
the or each local exchange having a local processor which is arranged to sequentially scan the outputs of the receivers located at its exchange and, when it detects a signal indicative of an alarm condition, to transmit a signal coded with information indicative of subscriber identity and of the desired terminal station to which the alarm information is to be routed, and
a central processor including a store for storing alarm information which allows the alarm information to be redirected from one terminal station to another, which central processor is connected to receive such coded signals transmitted from said local processor and to direct the alarm information to a desired one of a number of said terminal stations, wherein each said transmitter is arranged to produce a carrier wave which is modulated with one or more of a plurality of other frequencies according to the state of the alarm being monitored.

2. An alarm system as claimed in claim 1 wherein said carrier wave is amplitude modulated by a combination of three tone frequencies.

3. An alarm system as claimed in claim 1 or claim 2 wherein the modulated carrier wave has a frequencyy which is substantially different from the range of frequencies of speech signals transmitted along a telephone line.

4. An alarm system as claimed in claim 1 or 2 wherein each transmitter includes a carrier oscillator, the output of which is connected to a modulator, said modulator being connected to a plurality of tone oscillators the outputs of which modulate the carrier wave.

5. An alarm system as claimed in claim 4 wherein the tone oscillators are controlled by one or more alarm monitor circuits each of which includes a switching stage which is arranged to switch when an alarm is actuated.

6. An alarm system as claimed in claim 4 wherein the modulator output is connected by a filter to the telephone line.

7. An alarm system as claimed in claim 4 including means for connecting the transmitter to a mains power supply, an auxiliary rechargeable power supply and means for connecting the rechargeable power supply to supply power in the event of mains failure.

8. An alarm system as claimed in claim 4 wherein the transmitter is arranged to be housed within a cover attached to a surface, the cover being so mounted that its removal actuates a switch to indicate an alarm condition.

9. An alarm system as claimed in claim 4 wherein each receiver includes a band pass filter and a low pass filter each of which is connected to a telephone line, said band pass filter being arranged to transmit modulated carrier waves and said low pass filter being arranged to transmit speech signals.

10. An alarm system as claimed in claim 9 wherein the receiver includes a detector for detecting the amplitude modulated carrier wave, and decode logic for decoding the modulation tones to provide output information in binary from which is indicative of the state of an associated alarm.

11. An alarm system as claimed in claim 10 wherein the receiver includes a detector for detecting the level of the carrier signal, said detector being connected to said decode logic and including a bistate circuit which is arranged to change state when the carrier level changes beyond predetermined upper or lower limits.

12. An alarm system as claimed in claim 11 wherein said decode logic has an output connected to a light emitting device, said logic being arranged to provide signals for energizing said light emitting device when the carrier level changes beyond said limits.

13. An alarm system as claimed in claim 1 or 2 wherein each local processor has means for continuously scanning the outputs of the receivers connected thereto, memory means for storing data indicative of alarm conditions sensed during the previous scanning sequence, means for comparing the condition of each alarm with its condition during the previous scanning sequence and means responsive to said comparing means detecting a predetermined change in the condition of an alarm for transmitting a signal indicative of said alarm and its desired terminal station destination to the central processor.

14. An alarm system as claimed in claim 13 wherein said scanning means is arranged to provide a plurality of scans during a scanning sequence, one of said scans constituting a check of the condition of highways provided in the local processor.

15. An alarm system as claimed in claim 13 wherein said memory is a read/write memory.

16. An alarm system as claimed in claim 13 wherein said local processor includes an FDM/TDM transmitter for transmitting signals to the central processor and an FDM/TDM receiver for receiving signals from the central processor.

17. An alarm system as claimed in claim 1 or 2 wherein the central processor comprises a plurality of local processor terminations, one for each local processor, a plurality of terminal station terminations, highways linking the processor terminations and terminal station terminations, and means for sequentially scanning the local processor terminations, each terminal station termination being responsive to an alarm signal received by a processor termination and addressed with a particular code to direct that alarm signal to the appropriate termination.

18. An alarm system as claimed in claim 17 wherein each local processor termination includes an FDM/TDM receiver and an FDM/TDM transmitter.

19. An alarm system as claimed in claim 17 wherein each terminal station termination includes a portion of said store for storing alarm information which allows the alarm information to be redirected from one terminal station to another.

20. An alarm system as claimed in claim 1 or 2 wherein each terminal station includes alarm indication means actuable in response to receipt of alarm information from the central processor.

21. An alarm system as claimed in claim 20 wherein said alarm indication means includes a visual alarm and an audible alarm.

22. An alarm system as claimed in claim 20 wherein each terminal station includes means for recording the alarm information.

23. An alarm system as claimed in claim 22 wherein said recording means comprise a visual display device.

24. An alarm system as claimed in claim 20 wherein each terminal station includes means for transmitting a signal to the central processor in acknowledgement of receipt of alarm information.

25. An alarm system as claimed in claim 20 wherein each terminal station includes means for generating a test message signal for transmission to a particular local processor to test operation of the system.

26. A system of the type having local processor having a plurality of transmitters located at subscribers' premises, each transmitter being adapted to transmit signals indicative of the state of its associated alarm to a telephone line, said signals being in the form of modulated carrier waves, a respectively corresponding plurality of receivers located at one or more local exchanges for receiving the transmitted signals, the or each local exchange having a local processor which is arranged to sequentially scan the outputs of the receivers at its exchange and, when it detects a signal indicative of an alarm condition, to transmit a signal coded with information indicative of subscriber identity and the desired destination of alarm information to a central processor which is, in turn, operative to direct the alarm information to a desired one of a number of terminal stations, said system comprising:

means at each local processor for continuously scanning the outputs of the receivers connected thereto, memory means at each local processor for storing data indicative of alarm conditions sensed during the previous scanning sequence, means at each local processor for comparing the condition of each alarm with its condition during the previous scanning sequence, means located at the central processor for storing alarm information which allows the alarm information to be redirected from one terminal station to another, and means at each local processor responsive to said comparing means detecting a predetermined change in the condition of an alarm for transmitting a signal indicative of said alarm and of its desired terminal station destination to the central processor.

27. A local processor as claimed in claim 26 including highways interconnecting the elements of said local processor and wherein said scanning means is arranged to provide a plurality of scans during a scanning sequence, one of said scans constituting a check of the condition of the highways provided in said local processor.

28. A local processor as claimed in claim 26 or claim 27 wherein said memory is a read/write memory.

29. A local processor as claimed in claim 26 or 27 wherein said local processor includes an FDM/TDM transmitter for transmitting signals to the central processor and an FDM/TDM receiver for receiving signals from the central processor.

30. A central processor for a system of the type which has a plurality of transmitters located at subscribers' premises, each transmitter being adapted to transmit signals indicative of the sate of its associated alarm to a telephone line, said signals being in the form of modulated carrier waves, a respectively corresponding plurality of receivers located at one or more local exchanges for receiving the transmitted signals, the or each local exchange having a local processor which is arranged to sequentially scan the outputs of the receivers at its exchange and, when it detects a signal indicative of an alarm condition, to transmit a signal coded with information indicative of subscriber identity and the desired destination of alarm information to a central processor which is, in turn, operative to direct the alarm information to a desired one of a number of terminal stations, said local processor comprising:

a plurality of local processor terminations, one for each local processor, a plurality of terminal station terminations, highways linking the processor terminations and terminal station terminations, a store for storing alarm information thereby maintaining the alarm information available for use if it is to be redirected from one terminal station to another, and means for sequentially scanning the local processor terminations, each terminal station termination being responsive to an alarm signal received by a processor termination and addressed with a particular code to direct that alarm signal to the appropriate terminal station termination.

31. A central processor as claimed in claim 30 wherein each local processor termination includes an FDM/TDM receiver and an FDM/TDM transmitter.

32. A central processor as claimed in claim 30 or claim 31 wherein each terminal station termination includes a portion of said store for storing alarm information thereby maintaining the alarm information available for use if it is to be redirected from one terminal station to another.

* * * * *